United States Patent [19]

Macecek et al.

[11] Patent Number: 5,095,744
[45] Date of Patent: Mar. 17, 1992

[54] ULTRASONIC TIRE TESTING METHOD AND APPARATUS

[75] Inventors: Mirek Macecek, Toronto; Dave J. Allan, Richmond; Leslie Bubik, Toronto, all of Canada

[73] Assignee: Vulcan Equipment Company, Scarborough, Canada

[21] Appl. No.: 559,163

[22] Filed: Jul. 30, 1990

Related U.S. Application Data

[63] Continuation of Ser. No. 336,824, Apr. 12, 1989, abandoned.

[51] Int. Cl.⁵ .................... G01M 17/02; G01N 29/04
[52] U.S. Cl. ........................... 73/146; 73/600; 73/618
[58] Field of Search .................... 73/146, 600, 618

[56] References Cited

U.S. PATENT DOCUMENTS 3,882,717  5/1975  McCauley ............................. 73/600
4,275,589  6/1987  Dugger et al. ........................ 73/146

Primary Examiner—Donald O. Woodiel
Attorney, Agent, or Firm—Niro, Scavone, Haller & Niro

[57] ABSTRACT

A method and apparatus for non-destructive ultrasonic testing of tires is disclosed wherein an ultrasonic transmitter is positioned outside of the tire and applies pulses of ultrasound to the tire at a plurality of locations around the tire's circumference for transmission through the tire wall and receipt by an ultrasonic receiver located within the tire. The ultrasonic receiver generates signals in response to the received ultrasonic transmissions and a computer processes these signals to generate characterizing data from which defects in the tire may be determined. Signals representative of the defects are then processed to generate a graphic display illustrating the location of the defects with the tire.

22 Claims, 13 Drawing Sheets

ULTRASONIC TIRE TESTING METHOD AND APPARATUS

This is a continuation of co-pending application Ser. No. 07/336,324 filed on Apr. 12, 1989, now abandoned.

BACKGROUND OF THE INVENTION

1. Field of the Invention

The present invention relates generally to nondestructive tire testing and, more particularly, to the use of ultrasound for nondestructive tire inspection and testing.

2. Description of the Prior Art

The tire industry has recognzied for many years that it is useful to inspect or test tires in a nondestructive manner in order that defects in the tires may be readily identified and located. This need has been recognized both for new tires, prior to their initial use on automobiles or other vehicles, and for used tires, prior to retreading. Thus, it is desirable to detect flaws in the tire when the tire is complete with its tread. Various technologies have been suggested in the past to achieve these desireable results, but none has achieved substantial commercial acceptance. For example, halography has been used and can detect both holes and internal defects, such as ply separations, but it requires very expensive equipment used by operators who have been specially trained. Also, high voltage arc equipment has found limited application, but this equipment does not detect internal tire defects. Finally, ultrasound equipment has been used extensively, but it too suffers from a number of disadvantages, including the difficulty of obtaining accurate tire defect data and/or interpreting the test results which in some prior art equipment is presented on an oscilloscope.

U.S. Pat. Nos. 4,266,428, 4,285,235 and 4,275,589 disclose an apparatus and method for nondestructive testing of tires with ultrasound. More specifically, these patents teach the use of pair of ultrasonic transmitters having a beam width of 90° that are positioned within a tire that preferably has been buffed, i.e. had the tread pattern ground off in preparation for retreading. The apparatus retracts the transmitters into a central hub during installation and removal of the tire and extends them into the tire during testing. These transmitters produce ultrasound of a moderately high frequency, e.g. greater than approximately 40 KHz and, preferably, 75 KHz. The ultrasound rom these transmitters is applied to wall of a tire inflated to approximately 15–18 pounds per square inch ("PSI"). Numerous ultrasonic receivers are arranged about the tire's outer surface to receive ultrasound from one or the other of the transmitters. In addition to receiving ultrasonic signals from the transmitters within the tire, these receivers can also detect air leaking through the pressurized tire.

In testing a tire with ultrasound, the apparatus disclosed in these patents operate in a pulse burst transmission mode in which only a few periods (e.g. 30–100) of the acoustic waveform are applied to the tire. According to these patents, the use of pulse burst transmission allegedly reduces standing waves in the tire or unwanted reverberation effects. The two transmitters, located inside the inflated, revolving tire, are energized separately allegedly to prevent distortion of readings from peculiar wave cancellation, standing wave patterns or similar wave effects.

These patents also disclose that the electrical signal produced by the receivers passes through a gated receiver circuit so that only those signals within the initial portion (e.g. the first 10 cycles) of each pulse burst are used in testing the tire. According to these patents, using only the initial portion of each pulse burst reduces alteration of the envelope of the received acoustic signals by internal reverberation, standing wave, wave cancellation or other wave effects.

The gated receiver circuit included in each signal processing channel for each receiver includes an Automatic Gain Control ("AGC") amplifier. These patents disclose that the AGC amplifier is required to compensate both for differing wall thicknesses within a single tire, and for differing thicknesses between tires. The gated receiver also includes a rectifying circuit and an integrating circuit to average the signal over several cycles during the beginning of each pulse burst. To further improve the signal-to-noise ratio, the apparatus may also include a non-linear Analog-to-Digital Converter ("ADC") that digitizes the output signal from the integrating circuit.

These patents also teach that it is advantageous to test the tire with pulsed ultrasound at two different frequencies and to combine output signal obtained at these two different frequencies to avoid possible adverse standing wave effects and the like.

Despite the use of complex signal processing circuits and techniques in the apparatus disclosed in these patents, commercially available versions exhibit operational difficulties which limit their use. For example, the apparatus is extremely sensitive to noise from surrounding equipment. Accordingly, it is often necessary to isolate the apparatus in a special "quiet" room separated from other tire processing equipment. While the apparatus disclosed in these patents provides a visual oscilloscopic display of the testing results, reliably rejecting defective tires while not rejecting good ones requires observation and analysis of the display by an experienced and highly skilled operator. Also, this apparatus cannot reliably test treaded tires, i.e. tires that still retain a tread pattern and that are thicker than a buffed tire. Because these prior art products require buffing prior to ultrasonic testing, the time and cost of buffing a tire must first be expended before it may be discovered that the tire is defective and cannot be retread.

SUMMARY OF THE INVENTION

The present invention is directed to a method and apparatus for the nondestructive ultrasonic testing of tires which overcomes the problems associated with the prior art. The invention provides such a method and apparatus which are reliable and user friendly and which may be embodied in equipment that can be purchased at reasonable cost. Moreover, all forms of tire defects, including nail holes, belt separations, inner liner separations, retread separations and casing defects, may be identified and located in the practice of the invention.

Therefore, one object of the present invention is to provide a method and apparatus for ultrasonic tire testing having a display that does not require observation and analysis by a specially trained and highly skilled operator.

Another object of the present invention is to provide an ultrasonic tire testing apparatus that is less sensitive to ambient acoustical noise.

Another object of the present invention is to provide a method and apparatus for ultrasonic tire testing that reliably tests complete tires including a tread.

Another object of the present invention is to provide a method and apparatus for ultrasonic tire testing that more accurately tests buffed tires.

Another object of the present invention is to provide a labor saving method and apparatus for ultrasonic tire testing that eliminates the need to buff a tire prior to testing.

Another object of the present invention is to provide an improved apparatus for ultrasonic tire testing operable with a variety of differently sized tires.

Yet another object of the present invention is to provide an apparatus for ultrasonic tire testing which is simpler and more cost effective to manufacture, easier to maintain, and more economical to manufacture.

Briefly, the present invention includes a method for nondestructive testing of tires that employs pulses of ultrasound transmitted from an ultrasonic transmitter located on one side of a wall of a tire to an ultrasonic receiver located on the opposite side of the tire's wall. In this method of ultrasonic tire testing, the transmission of ultrasound through the tire's wall is characterized at a plurality of locations along the circumference of the tire. This characterization is obtained by successively applying a series of pulses of ultrasound to the tire's wall with the ultrasonic transmitter and sensing ultrasonic emanations from the wall with an ultrasonic receiver. Each characterization of the transmission of ultrasound through the wall of the tire is then accumulated for a plurality of locations distributed circumferentially about the tire. The method of the present invention then identifies a repetitive pattern present in the accumulated characterizations of ultrasound transmission through the wall of the tire. This repetitive pattern is then used in identifying defective areas on the tire when searching the accumulated characterizations of ultrasonic transmission.

To reduce the sensitivity to ambient acoustic noise, the method further includes inserting an array of ultrasonic receivers into the tire. After the array of ultrasonic receivers is within the tire, the array is rotated about an axis to dispose the ultrasonic receivers axially across the tire between its sidewalls. Finally, the ultrasonic receivers are positioned at a pre-established distance from the inner surface of the tire.

A nondestructive tire testing apparatus in accordance with the present invention includes an encoder that produces an electronic signal indicative of tire rotation. The apparatus also includes electronic circuits that cause pulses of ultrasound to be produced periodically by exciting the ultrasonic transmitters at locations distributed around the circumference of the tire. A signal processing circuit included in the apparatus receives an electronic signal from the ultrasonic receiver and measures values of that signal for each pulse of ultrasound. The signal processing circuit then stores those measured values for subsequent analysis. The apparatus includes a computer that retrieves the values stored by the signal processing circuit and analyzes the stored values to determine the characteristics of the transmission of ultrasound through the tire's wall from the measured values. Further, the computer identifies defective locations on a tire from the characteristics of the ultrasound transmitted through the tire's wall.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 8 is a timing diagram showing various electronic waveforms associated with the application of a single pulse of ultrasound to a tire;

DETAILED DESCRIPTION OF THE PREFERRED EMBODIMENT

Figure 1:
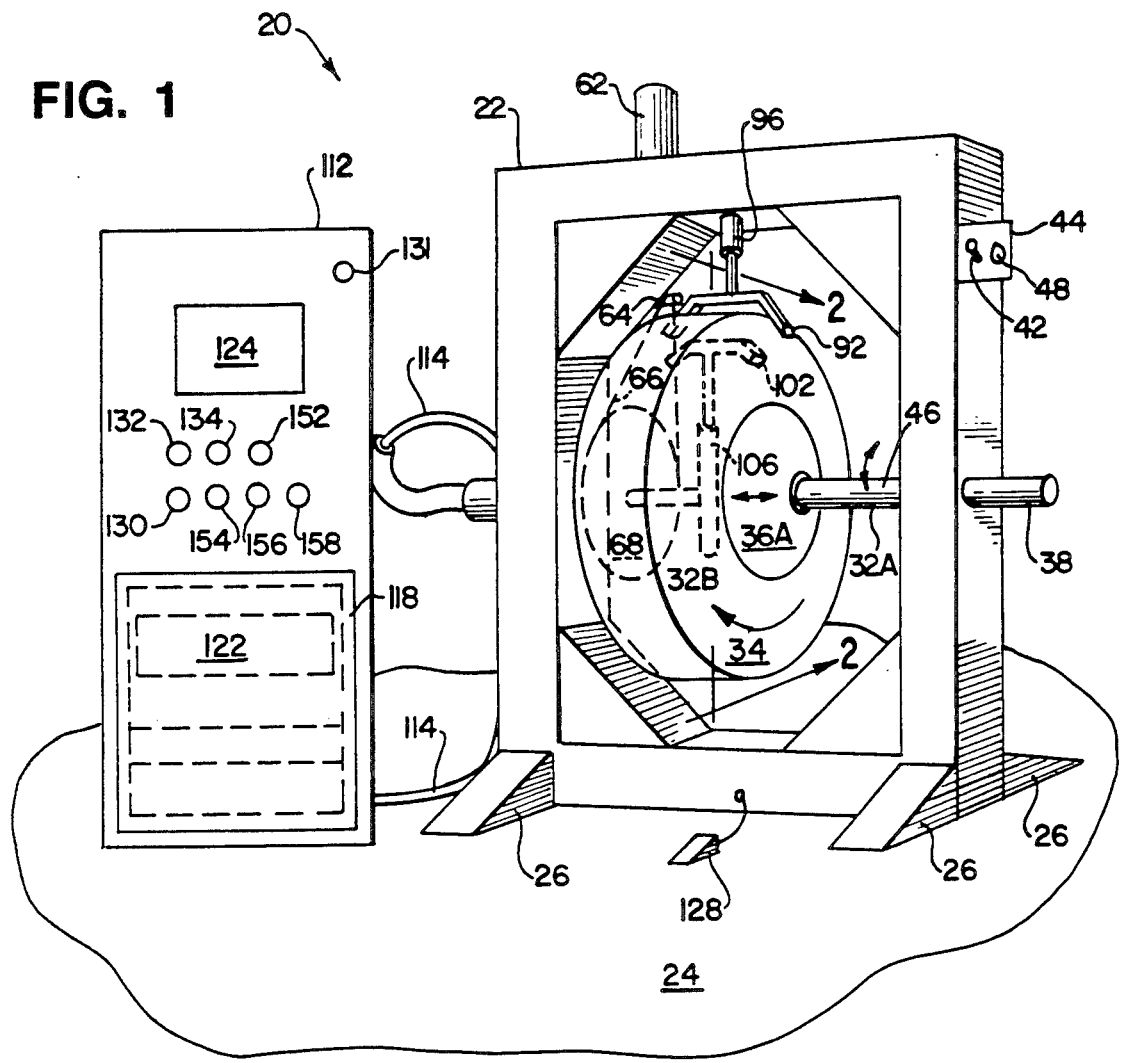
FIG. 1 depict a nondestructive tire testing apparatus in accordance with the present invention including its ultrasonic transmitters and receivers, and its control console that itself includes a CRT display and a computer that controls the apparatus' operation.

Depicted in FIG. 1 is a nondestructive tire testing apparatus in accordance with the present invention referred to by the general reference character 20. . Included in the testing apparatus 20 is an open, box-shaped tire support frame 22. The base of the support frame 22 rests on a floor 24 and is stabilized there by triangularly shaped feet 26 projecting outward from both the front and rear of the frame 22.

Tire Support and Mounting

Rotatably mounted within the support frame 22 on opposing ends of two hollow, stationary support shafts 32A and 32B is a tire 34. The tire 34 is mounted on a pair of rotary hubs 36A and which, in turn, are mounted on the inwardly projecting ends of the support shafts 32A and 32B. (Only one of the hubs 36A is illustrated in FIG. 1) A pneumatic or hydraulic cylinder 38 may be used to move the support shaft 32A together with its hub 36A laterally inward toward the tire 34 enclosed within the support frame 22, or outward away from the tire 34. Energizing the cylinder 38 is effected by a control switch 42 mounted on a control panel 44 secured to one side of the support frame 22.

After the pressure within the tire 34 has been released, the tire 34 may be removed from the apparatus 20 by first rotating a semi-circular thrust plate 46 upward away from the support shaft 32A and toward the rear of the support frame 22. With the thrust plate 46 now moved out of the way, cylinder 38 may then be energized using the control switch 42 to retract the support shaft 32A carrying with it the hub 36A outward from the tire 34 toward one side of the support frame 22. The support shaft 32A travels sufficiently outward away from the tire 34 to demount the tire 34 from the hub 36A thereby leaving the tire 34 supported by only the other hub 36B (not illustrated in FIG. 1). With the hub 36A now retracted next to the support frame 22 far away from the tire 34, the tire 34 may be easily demounted from the other hub and removed from the support frame 22.

Figure 2:
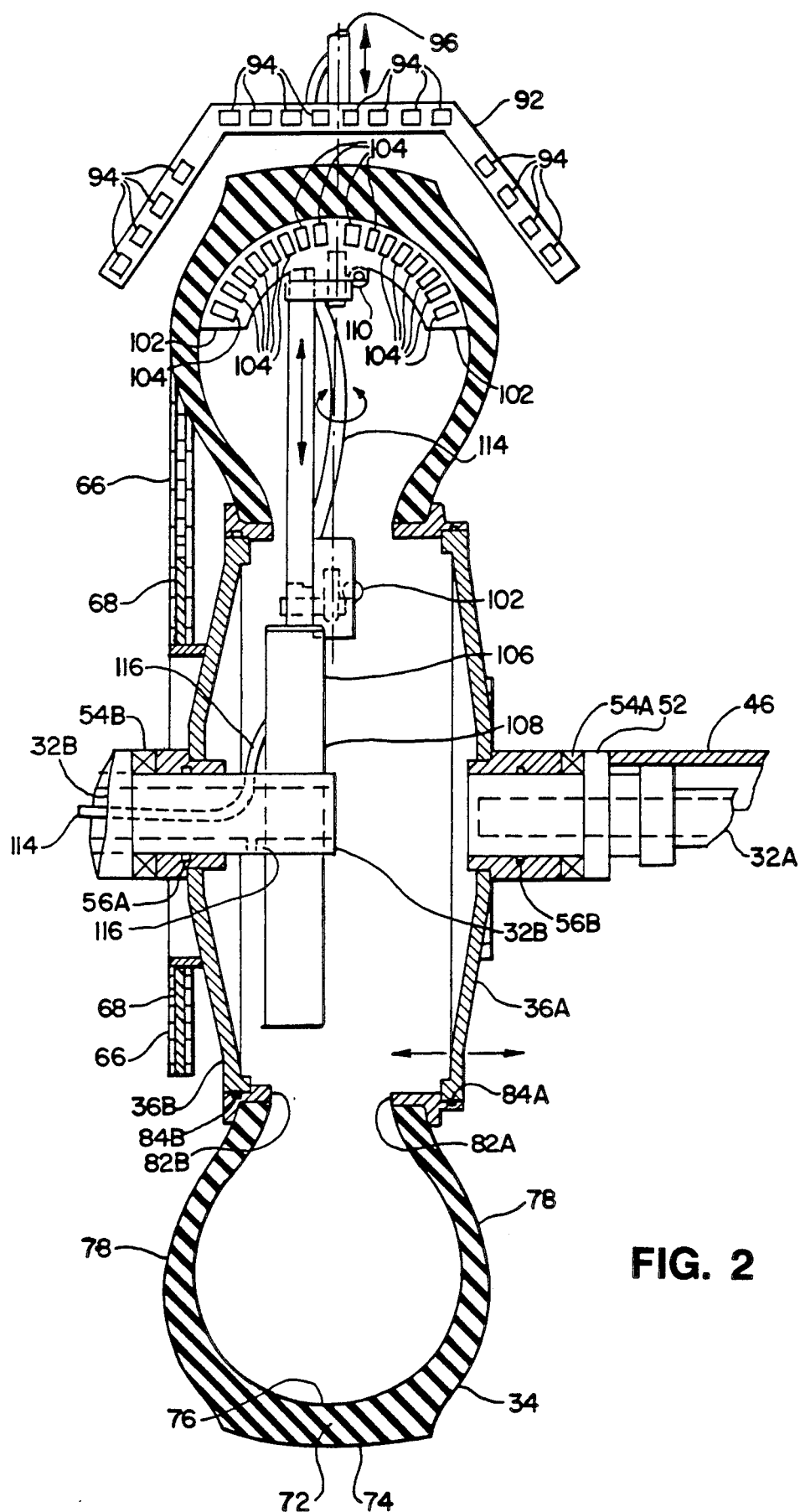
FIG. 2 depicts a cross-sectional view of a portion of the tire-testing apparatus taken along the line 2—2 of FIG. 1 showing a portion of a tire mounted thereon and the apparatus' ultrasonic transmitters and receivers.

A tire 34 is installed on the support frame 22 by reversing the preceding process for removing a tire 34. In installing a tire 34 on the support frame 22, after the cylinder 38 has been energized and has fully extended the support shaft 32A and the hub 36A inward toward the middle of the support frame 22, the thrust plate 46 may be easily moved forward and downward over the support shaft 32A. When the tire 34 is subsequently pressurized, using a toggle valve 48 also included in the control panel 44, the pressure within the tire 34 drives the hub 36A together with the support shaft 32A outward toward the support frame 22. Referring now to FIG. 2, outward movement of the hub 36A stops when an annularly shaped collar 52 surrounding the support shaft 32A contacts one end of the thrust plate 46 thereby urging the other end of the trust plate 46 into contact with the support frame 22. Thus, rather than the support shaft 32A carrying the outward force of the tire 34 to the support frame 22, a thrust bearing 54A and the annularly shaped collar 52 couple the outward force of the pressurized tire 34 from the hub 36A to the moveable thrust plate 46 which transfers that force directly to the support frame 22. A thrust bearing 54B similarly transfers the forces transmitted from the tire through the hub 36B directly to the support frame 22. O-rings 56A and 56B, respectively encircling the support shafts 32A and 32B, provide seals between the rotary hubs 36A and 36B and the stationary support shafts 32A and 32B.

Rotation of the tire 34 is effected by a direct current, two speed electric motor 62 shown projecting above the support frame 22 in FIG. 1. A suitable transmission or gear mounted on the rear of the support frame 22 (not illustrated) couples the rotation of the vertically oriented shaft of the electric motor 62 to a horizontally oriented shaft. Secured about the horizontally oriented shaft is a small diameter chain driving sprocket (not illustrated), and secured to the end of the horizontally oriented shaft is a shaft angle encoder 64. The small diameter sprocket engages a chain 66 that encircles and engages a large diameter sprocket 68 secured to the hub 36B.

As depicted in FIG. 2, the tire 34 includes a wall 72 having an outer surface 74 and an inner surface 76 which may be pressurized when sealed by the hubs 36A and 36B. The tire 34 also includes two sidewalls 78 which mate with and engage a pair of adapter rings 82A and 82B. The adapter rings 82A and 82B are respectively juxtaposed with, encircle, and engage the outer diameter of the hubs 36A and 36B. Large diameter O-rings 84A and 84B respectively encircle the hubs 36A and 36B to provide seals between the hubs 36A and 36B and the adapter rings 82A and 82B. Different diameter adapter rings 82A and 82B are installed around the hubs 36A and 36B to adapt the apparatus 22 for testing various different sizes of tires.

O-rings 56A, 56B, 84A and 84B are respectively used to seal between the hubs 36A and 36B and the adapter rings 82A and 82B to prevent leakage when the tire 34 is pressurized. Because even very small leaks can produce significant amounts of ultrasound having frequencies in the same range as that used in testing the tire 34, successful testing requires that all such sources of leakage be well sealed and that such leakage be substantially eliminated.

Ultrasonic Transmitters and Receivers

As depicted in FIG. 2, disposed above the outer surface 74 of the wall 72 of the tire 34 and extending downward toward each of the sidewalls 78 is a planar array 92 of 16 ultrasonic transmitters 94. The ultrasonic transmitters 94 preferably have a relatively narrow beam angle of approximately 20°, and are preferably designed to transmit acoustical energy at approximately 40 KHz. Model MA40A5S ultrasonic transmitters manufactured by muRata may be used for the ultrasonic transmitters 94.

As depicted in FIG. 1, located at the top of the support frame 24 is a mechanical drive 96 for lowering the transmitter array 92 toward the outer surface 74 of the tire 34 and also for raising it away from the outer surface 74. The transmitter array 92 includes mechanical switches (not illustrated) which operate upon contacting the outer surface 74 of the tire 34. Accordingly, the testing apparatus 22 can sense when the mechanical drive 96 has lowered the transmitter array 92 into contact with the outer surface 74 of the tire 34. The mechanical drive 96 also includes an electronic sensor for measuring the extension of the transmitter array 92 downward toward the outer surface 74 of the tire 34. Since the distance between the center of the tire 34 about which it rotates and the top of the support frame 24 is determined when the support frame 24 is fabricated, electronic measurement of the downward extension of the transmitter array 92 by the mechanical drive 96 allows the apparatus 22 to determine the diameter of the tire 34 prior to testing. After first determining the diameter of the tire 34 by contacting its outer surface 74, the apparatus 22 then positions the ultrasonic transmitters 94 approximately one inch above the tire's surface.

As depicted in FIG. 2, disposed across the tire 34 between its sidewalls 78 and adjacent to its inner surface 76 is a planar array 102 of 16 ultrasonic receivers 104. The ultrasonic receivers 104 also preferably have a relatively narrow beam angle of approximately 20°, and are preferably designed to receive acoustical energy at approximately 40 KHz. Model MA40A5R ultrasonic receivers manufactured by muRata may be used for the ultrasonic receivers 104.

The receiver array 102 is supported adjacent to the inner surface 76 of the tire 34 by a mechanical drive 106 secured to an end of the support shaft 32B. A stepper motor 108, included in the mechanical drive 106, energizes it for extending the receiver array 102 toward the inner surface 72 of the tire 34 and for retracting the array 102 away from the inner surface 72.

Prior to removing the tire 34 from the hubs 36A and 36B, the mechanical drive 106 retracts the receiver array 102 downward away from the inner surface 76 of the tire 34 to position the receiver array 102 within the outer diameters of the hubs 36A and 36B. Because when the receiver array 102 is disposed across the tire 34 between sidewalls 78 it is wider than the distance between the sidewalls 78 at their respective junctures with the adapter rings 82A and 82B, the receiver array 102 includes an electric motor 110 to rotate it into a position substantially parallel to the sidewalls 78 of the tire 34 while the mechanical drive 106 retracts the receiver array 102 out of the tire 34. During testing of a tire 34 after it has been mounted on the hubs 36A and 36B, the preceding process is reversed. Thus, while the mechanical drive 106 extends to insert the receiver array 102 into the tire 34 and position it adjacent to the inner surface 76, the electric motor 110 rotates the receiver array 102 across the tire 34 between its sidewalls 78.

The receiver array 102 includes mechanical switches (not illustrated) which operate upon contacting the inner surface 76 of the tire 34. Accordingly, the testing apparatus 22 can sense when the mechanical drive 106 has inserted the receiver array 102 into contact with the inner surface 76 of the tire 34. However, differing from the mechanical drive 96, the mechanical drive 106 does not include an electronic sensor for measuring how far the receiver array 102 has extended toward the inner surface 76 of the tire 34. Rather, since the extension and retraction of the receiver array 102 is effected by the stepper motor 108, after the mechanical switches contact the inner surface 76 of the tire 34 the receivers 104 are positioned the proper distance of approximately one-half inch from the inner surface 76 of the tire 34 merely by retracting the array 102 a pre-established number of steps of the stepper motor 108.

The ultrasonic transmitters 94 and the ultrasonic receivers 104 are respectively secured to the transmitter array 92 and to the receiver array 102 in pairs with the beam axis of each transmitter 94 and receiver 104 of each pair being aimed toward the other. Accordingly, each of the ultrasonic receivers 104 is adapted to receive ultrasound emanating from that area of the wall 72 of the tire 34 upon which impinges ultrasound from the transmitter 94 with which the particular receiver 104 is paired.

Control Console

Referring again to FIG. 1, depicted to the left of the support frame 22 is a control console 112 which is connected to the support frame 22 by a signal cable 114. Signals to and from various different items mounted on the support frame 22, that are discussed in greater detail below, pass over the cable to or from the control console 112. Thus, for example, conductors in the cable 114 provide electrical signals for controlling the operation of the motor 62 and thereby control the rotation of the tire 34. Conductors within the cable 114 also carry electrical signals from the shaft angle encoder 64 back to the control console 112. Similarly, as illustrated in FIG. 2, conductors in the signal cable 114 carry signals to the ultrasonic transmitters 94, from the ultrasonic receivers 104, and to the electric motors 108 and 110. To reach the ultrasonic receivers 104 and the motors 108 and 110 located within the tire 34, the control cable passes down the hollow middle of the support shaft 32B and through an aperture 116 formed therethrough. The hollow support shaft 32B is also used for infusing compressed air into the tire 34 for pressurizing it and for releasing such pressure. Thus, the outer end of the support shaft 32B away from the hub 36B includes a seal (not illustrated) between the signal cable 114 and the support shaft 32B. Furthermore, this same outer end of the support shaft 32B also includes an aperture (not illustrated) for introducing compressed air into the hollow support shaft 32B.

Totally enclosed within the lower half of the control console 112 and covered by a solid front panel 118 is a personal computer 122. A CRT display 124 associated with the computer 122 is located in the upper half of the control console 112. The personal computer 122 preferably includes an Intel 80386 microprocessor operating at a 20 MHz clock rate together with an 80387 floating point co-processor chip. The CRT display 124 is preferably capable of displaying characters and images in various different colors up to a resolution of 640×480 pixels.

Operator Tire Testing Controls and Indicators

The tire testing apparatus 20 includes various indicators and controls used by its operator in addition to those described previously that an operator uses in mounting, pressurizing and demounting the tire 34. Thus after a tire 34 is mounted but prior to beginning its test, an operator may cause the tire 34 to rotate for visual inspection by depressing a foot switch 128 located on the floor 24 in front of the support frame 22. To commence the tire testing procedure, an operator presses a start switch 130 located on the front of the console 112. After the start switch 130 has been pressed, a tire testing procedure begins accompanied by the illumination of a red lamp 132 on the control console 112 that remains illuminated while the tire 34 is being examined ultrasonically. Upon completion of the ultrasonic examination of the tire 34 and commencement of a data analysis portion of the testing procedure, an amber lamp 134 is illuminated on the control console 112. When the data analysis is completed, an operator is automatically presented with a graphic image on the CRT display 124 that depicts the locations of defects on the tire 34.

Figure 3:
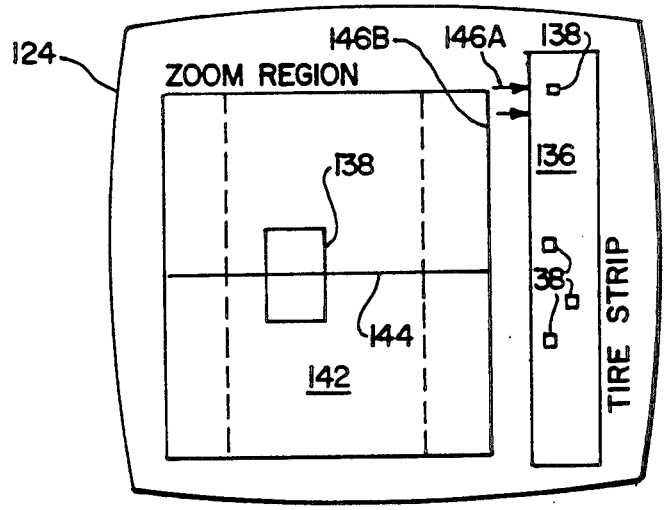
FIG. 3 illustrates the graphic image that appears upon the CRT display to indicate the locations of defective areas on a tire.

As illustrated in FIG. 3, the graphic image on the CRT display 124 includes an elongated rectangular area 136 located along the right hand edge of the display 124 that extends from the top to the bottom of the display 124. The elongated rectangular area 136 depicts the entire circumference of the tire tread area 34 as though the tire 34 had been cut in half across its width and laid out flat. The rectangular area 136 appears in a background color such as yellow with the defective locations appearing as smaller rectangular areas 138 of a different color such as red.

Occupying substantially the remainder of the CRT display 124 to the left of the rectangular area 136 is another rectangular area 142 whose center is marked by a horizontal line 144. An enlargement of a horizontal strip across the rectangular area 136 appears in the rectangular area 142. Two arrows 146a and 146b, located immediately to the left of the rectangular area 136, indicates the location of the zoom region 144 across the enlarged area 142 with respect to the display of the circumference of the tire 34 displayed in the narrow area 136. Since the image displayed in the rectangular area 142 is an enlargement of a portion of that displayed in the rectangular area 136, the background of the image in the rectangular area 142 appears in the same color as the background color for the rectangular area 136, and defective areas 138 also appear in the same color in both of the rectangular areas 136 and 142.

Referring again to FIG. 1, when the defective areas 138 initially appear on the CRT display 124, a green lamp 152 is illuminated on the control console 112. Illumination of the green lamp 152 indicates that an operator may now press a continue switch 154 located on the control console 112. Upon initially displaying defective areas 138 to an operator, an enlargement of the first defective area 138 appears in the rectangular area 142, and the tire 34 is rotated to position the corresponding defective location conveniently for operator inspection. By pressing the continue switch 154, an operator advances the image displayed in the rectangular area 142 from one defective area 138 to the next. As each successive defective area 138 is displayed, the arrow 146 moves progressively down the left hand side of the rectangular area 136 while the tire 34 simultaneously rotates to position the corresponding defect location conveniently for an operator. In this way, an operator may inspect the location of each defect identified by the testing procedure. If an operator decides to terminate inspecting the tire 34 before all defective areas have been inspected, a finish switch 156 is pressed to end the testing procedure.

A two-position speed switch 131 is also mounted on control console 112. Switch 131 controls the speed of motor 62, permitting a first speed for scanning the tire 34 during ultrasonic testing and a second speed to position the tire 34 when locating the identified defects. Preferably, the second speed is faster than the first.

If for any reason testing must be halted, perhaps while the tire is being examined ultrasonically, an operator presses an emergency stop switch 158. Pressing the emergency stop switch 158 immediately halts operation of the entire testing apparatus 20 including tire rotation. An operator may resume testing from where it was halted by manually resetting the switch 158.

Digital Interface Card

Figure 4:
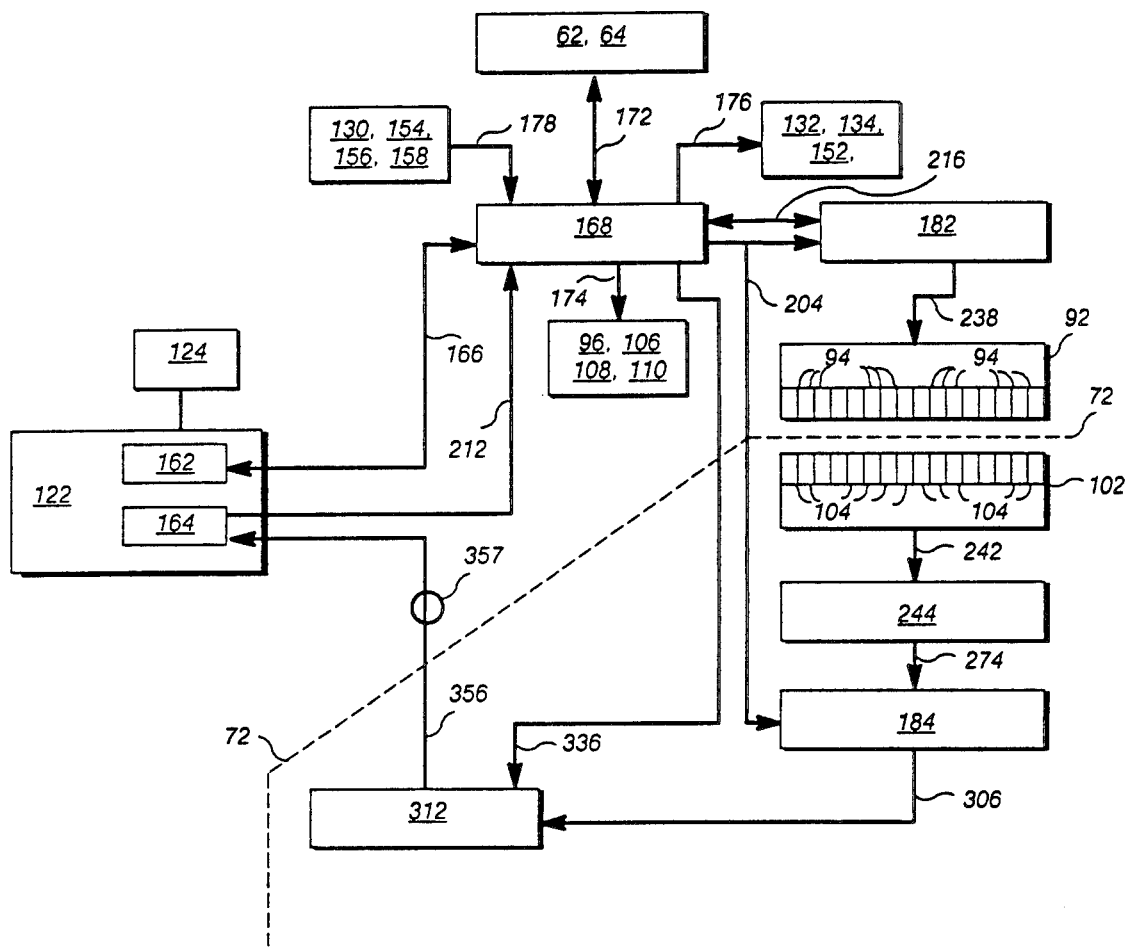
FIG. 4 a functional block diagram of the apparatus of FIG. 1 illustrating the computer included therein together with various devices controlled by the computer and to which the computer responds including a digital interface card, a transmitter selector circuit, the ultrasonic transmitters and receivers, a receiver pre-amplifier circuit, a receiver multiplexing circuit, and a receiver signal conditioning circuit.

FIG. 4 depicts the various functional elements of the testing apparatus 20 including the computer 122 and its associated CRT display 124. Included within the digital computer 122 are a digital input/output ("DIO") board 162 and an analog input ("AI") board 164. The DIO board 162, a Qua Tech PXB241, includes 3 8 bit input/output ports and an interrupt. The AI board 164, an Adaptronics PCTR160, includes an analog-to-digital converter ("ADC"). As depicted in FIG. 4, a multi-signal digital data bus 166 connects the DIO board 162 to a digital interface card 168.

The digital interface card 168 is connected to the electric motor 62 and to the shaft angle encoder 64 by a motor/encoder signal bus 172. Similarly, a transmitter/receiver position signal bus 174 connects the digital interface card 168 to the mechanical drives 96 and 106 including the motors 108 and 110. The various lamps 132, 134 and 152 are connected to the digital interface card by a lamp signal bus 176. Electrical signals passing over the digital data bus 166 from the DIO board 162 within the computer 122 through the digital interface card 168 and over the various buses 172, 174 and 176 turn the motor 62 on and off to control the rotation of the tire 34, cause the mechanical drives 96 and 106 to respectively extend and retract the transmitter array 92 and the receiver array 102 toward and away from the wall 72 of the tire 34, rotate the receiver array 102, and illuminate and extinguish the various indicator lamps 132, 134 and 152.

An operator control signal bus 178 connects the various operator switches 130, 154, 156 and 158 to the digital interface card 168. Electrical signals from the various operator control switches 130, 154, 156 and 158 pass over the bus 178 through the digital interface card 168 and over digital data bus 166 to the DIO board 162 within the computer 122. The electrical circuits within the digital interface card that respond to the various preceding signals on the buses 166, 172, 174, 176 and 178 are completely conventional and, therefore, require no additional explanation.

Transmission of Ultrasound

Figure 5:
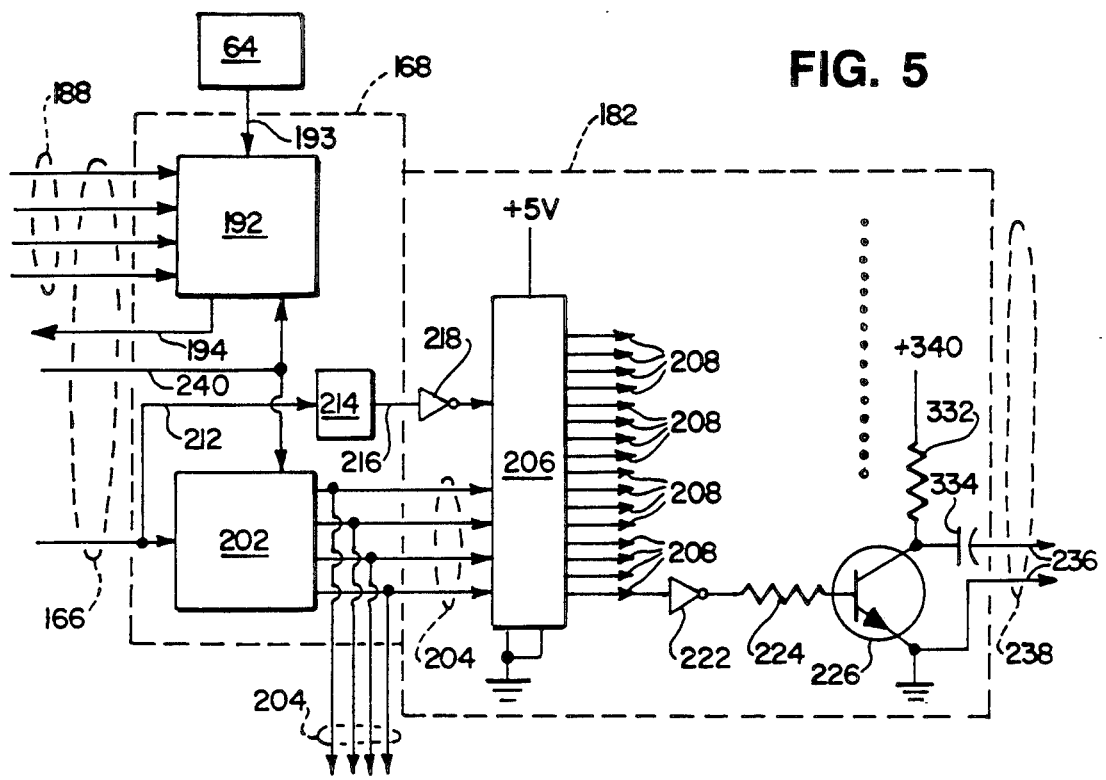

In addition to the functions described above, the digital interface card 168 coordinates the operation of the ultrasonic transmitters 94 and the ultrasonic receivers 104 through signals transmitted to a transmitter selector circuit 182 and to a receiver multiplexing circuit 184. Referring now to FIG. 5, depicted there is an electronic circuit diagram for that portion of the digital interface card 168 which coordinates the operation of the ultrasonic transmitters 94 and receivers 104, and also of the transmitter selector circuit 182. As depicted in FIG. 5, the DIO board 162 in the computer 122 supplies 4 signals via an encoder count bus 188 included in the multi-signal bus 166 to an encoder counter 192 included in the digital interface card 168. The signals present on the encoder count bus 188 are used to preset the encoder counter 192.

The encoder counter 192 also receives and counts pulses received from the shaft angle encoder 64 over an encoder signal line 193 while the tire 34 rotates. When the number of pulses from the shaft angle encoder 64 equal the number with which the encoder counter 192 is preset by the computer 122, a flip-flop included in the encoder counter 192 is set. Setting of the flip-flop included in the encoder counter 192 causes the digital interface card 168 to transmit a signal to an interrupt input of the DIO board 162 via an encoder interrupt signal line 194 included in the multi signal bus 166. Concurrently with the transmission of the interrupt signal to the DIO board 162, the encoder counter 192 is immediately again preset with the count then present on the encoder count bus 188. Thus, it immediately resumes counting pulses from the shaft angle encoder 64 in preparation for the next ultrasound scan across the width of the tire 34.

In response to a signal on the encoder interrupt signal line 194, the computer 122 initiates an ultrasound scan of all 16 ultrasonic transmitters 94 in the transmitter array 92. Consequently, the number transmitted from the computer 122 to the encoder counter 192 via the encoder count bus 188 controls the angular spacing and, hence, the circumferential spacing of successive ultrasound scans along the circumference of the tire 34. In the preferred embodiment of the present invention, the number transmitted to the encoder counter 192 is computed using the measured diameter of the tire 34 to space successive ultrasound scans approximately every one-quarter inch around the circumference of the tire 34.

The digital interface card 168 includes a four bit transmitter and receiver counter 202. The transmitter and receiver counter 202 transmits signals over a transmitter-receiver selector bus 204 from the digital interface card 168 to a transmitter selector multiplexer 206 included in the transmitter selector circuit 182. The four signals present on the transmitter-receiver selector bus 204 control the selection of one of the ultrasonic transmitters 94 by signals present on its 16 output signal lines 208.

In initiating an ultrasound scan in response to the signal on the encoder interrupt signal line 194, the computer 122 initializes and activates the AI board 164. Initializing the AI board 164 includes setting its sampling rate at 625 KHz and specifying that 1024 samples are to be taken. The AI board 164 commences sampling the signal from one of the ultrasonic receivers 104 immediately after it has been initialized by the computer 122.

When data sampling begins, the AI board 164 commences transmitting a signal to the digital interface card 168 via a data sampling control signal line 212 included in the multi-signal bus 166. Commencement of the signal on the data sampling control signal line 212 causes a multi-vibrator 214 included in the digital interface card 168 to transmit a single, 100 microsecond long ultrasound transmit interval pulse. This output pulse from the multi-vibrator 214 is transmitted via a pulse interval signal line 216 and an inverter 218, included in the transmitter selector circuit 182, to the transmitter selector multiplexer 206. Occurrence of the 100 microsecond long pulse on the pulse interval signal line 216 causes the transmitter selector multiplexer 206 to transmit a corresponding 100microsecond long pulse on that one of its output signal lines 208 specified by the signals present on the transmitter-receiver selector bus 204.

The 100 microsecond long pulse present on the selected output signal line 208 of the transmitter selector multiplexer 206 is applied through an inverter 222 and a resistor 224 to the base of a transistor 226. The emitter of the transistor 226 is connected to circuit ground while its collector is connected to the junction of a resistor 332 with a capacitor 334. When the pulse is absent from the output signal line 208 of the transmitter selector multiplexer 206, the transistor 226 is turned off and the junction of the resistor 332 and the capacitor 334 charges to a +340 volt potential applied to the other terminal of the resistor 332. When the pulse occurs on the selected output signal line 208, the transistor 226 turns on thereby grounding the junction of the capacitor 334 with the resistor 332 and discharging the capacitor 334. Discharging the capacitor 334 applies a 340 volt negative spike across one pair of 16 pairs of leads 236 included in a transmitter drive signal bus 238 that connects the transmitter selector circuit 182 to the ultrasonic transmitters 94 in the transmitter array 92. Application of the −340 volt negative spike energizes the ultrasonic transmitter 94, to which to the leads 236 connect, to emit a pulse of ultrasound having a frequency of approximately 40 KHz.

After the AI board 164 collects all 1024 data samples for this pulse of ultrasound, it removes the signal present on the data sampling control signal line 212. Ending of the signal present on the data sampling control signal line 212 causes the count present in the transmitter and receiver counter 202 to increment by one. Incrementing the count present in the transmitter and receiver counter 202 changes the signals present on the transmitter-receiver selector bus 204. Changing the signals present on the transmitter-receiver selector bus 204 causes the transmitter selector multiplexer 206 to select a different ultrasonic transmitter 94 to be energized when the AI board 164 again begins collecting data and thereupon again commences transmitting a signal to the digital interface card 168 via a data sampling control signal line 212.

While only a single inverter 222, resistor 224, transistor 226, resistor 232, capacitor 234 and pair of leads 236 are depicted in FIG. 5, the transmitter selector circuit 182 actually includes 16 sets of these components. Accordingly, one set of these components provides the driving signal to each of the ultrasonic transmitters 94 included in the transmitter array 92.

After the AI board 164 has completed collecting 1024 data samples for all 16 pulses of ultrasound, the DIO board 162 sends a signal to the encoder counter 192 and to the transmitter and receiver counter 202 over a clear the encoder interrupt signal line 240 included in the multi-signal bus 166. The signal on the clear the encoder interrupt signal line 240 resets the flip-flop included in the encoder counter 192 to remove the interrupt signal from the input of the DIO board 162 thereby enabling the encoder counter 192 to send the next interrupt to the DIO board 162. The signal on the clear the encoder interrupt signal line 240 also resets the transmitter and receiver counter 202 thereby insuring that the transmission of pulses of ultrasound always begins with the same ultrasonic transmitter 94.

Reception of Ultrasound

As indicated schematically in FIG. 4, the pulses of ultrasound emitted one after another by the ultrasonic transmitters 94 impinge upon the wall 72 of the tire 34 in the areas toward which is directed the ultrasonic receiver 104 with which the respective transmitter 94 is paired. Consequently, some portion of the ultrasound applied to one side of the wall 72 of the tire 34 by each ultrasonic transmitter 94 emanates from the other side of the wall 72 to the ultrasonic receiver 104 with which that transmitter 94 is paired. The output signals produced by the ultrasonic receivers 104 in response to such ultrasound are transmitted over a pre-amplifier input bus 242 to a receiver pre-amplifier circuit 244.

Figure 6:
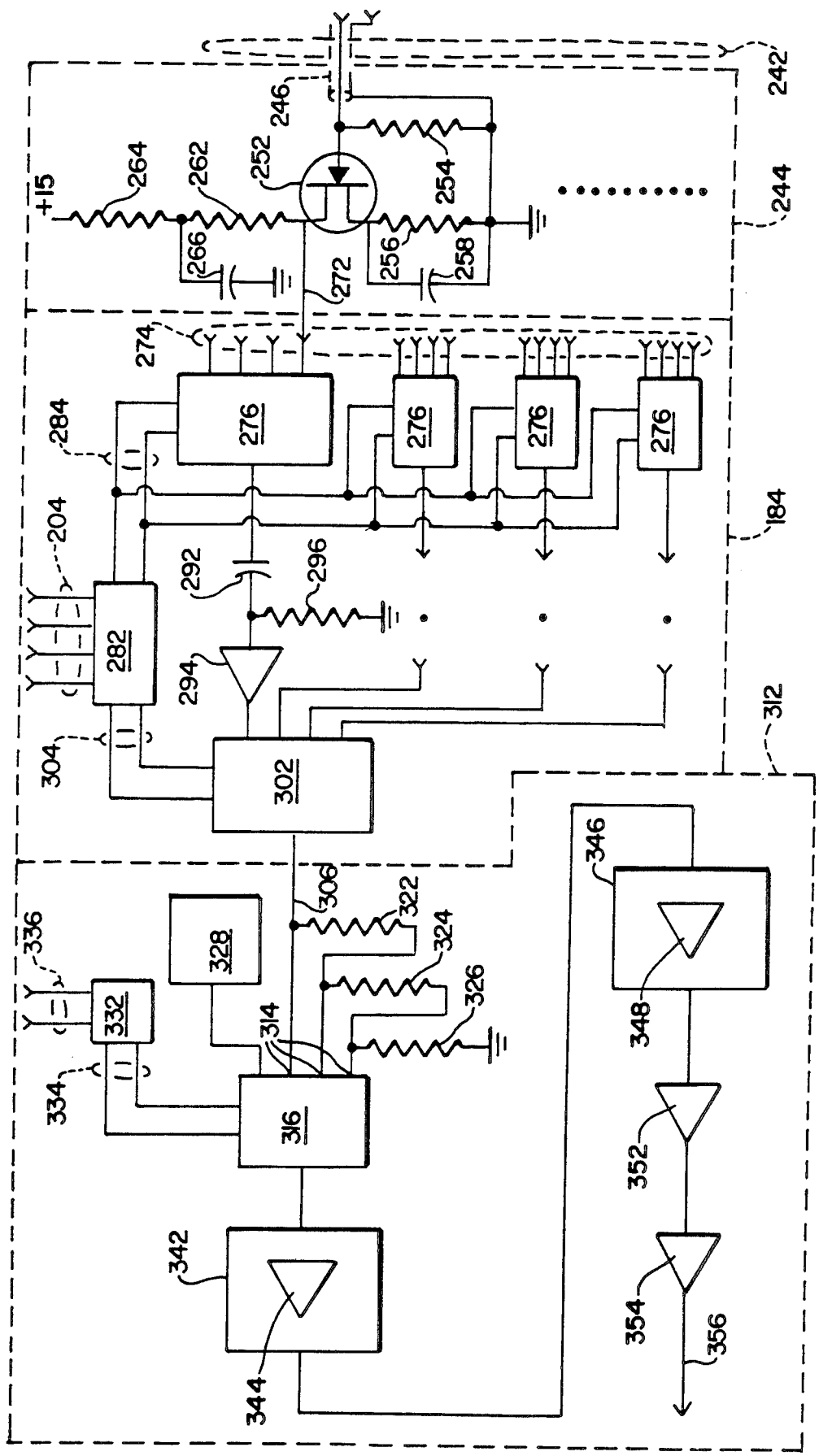
FIG. 6 is a circuit diagram depicting the receiver pre-amplifier circuit, the receiver multiplexing circuit, and the receiver signal conditioning circuit illustrated in FIG. 4.

Referring now to FIG. 6 depicted there is a circuit diagram of a pre-amplifier which receives the output signal from an ultrasonic receiver 104 via a shielded lead 246 included in the pre-amplifier input bus 242. Because there are 16 ultrasonic receivers 104 in the receiver array 102, there are 16 such shielded leads 246 in the pre-amplifier input bus 242 and 16 pre-amplifiers in the receiver pre-amplifier circuit 244. Within the receiver pre-amplifier circuit 244, the signal from the ultrasonic receiver 104 present o the shielded lead 246 is applied directly to the base of a field effect transistor ("FET") 252. A resistor 254 is connected between the base of the FET and circuit ground. A parallel connected resistor 256 and capacitor 258 similarly connect the emitter of the FET 252 to circuit ground. A pair of series connected resistors 262 and 264 connect the collector of the FET 252 to a positive 15 volt power supply. A capacitor 266 is connected between the junction of the resistors 262 and 264 and circuit ground. Thus, the output signals from each of the 16 receivers 104, after being individually amplified in the 16 pre-amplifiers included in the receiver pre-amplifier circuit 244, are transmitted over 16 leads 272 in a receiver multiplexer bus 274 to the receiver multiplexing circuit 184.

Within the receiver multiplexing circuit 184, the amplified output signal from the ultrasonic receivers 104 are applied via the leads 272 to input amplifying-multiplexers 276. Each of the input amplifying-multiplexers 276 includes 4 individual amplifiers each of which individually receives the amplified output signal from one of the ultrasonic receivers 104. Control signals applied to the input amplifying-multiplexers 276 from an opto-isolator 282 via a multiplexer input control signal bus 284 select the output signal from one of the 4 ultrasonic transmitters 104 applied thereto for amplification and retransmission by each of the input amplifying-multiplexers 276.

The output signal from each of the input amplifying-multiplexers 276 is applied through a capacitor 292 to the input of an amplifier 294. A resistor 296 connects the input of the amplifier 294 to circuit ground. While only one capacitor 292, amplifier 294 and resistor 296 are illustrated in FIG. 6, the receiver multiplexing circuit 184 actually includes four such sets of components, one set receiving the output signal from one of the four input amplifying-multiplexers 276. The output signals from each of the four amplifiers 294 are respectively applied to individual inputs of an output amplifying-multiplexer 302. Control signals applied to the output amplifying-multiplexer 302 from the opto-isolator 282 via a multiplexer output control signal bus 304 select the output signal from one of the 4 amplifiers 294 for retransmission by the output amplifying-multiplexers 276.

Signals for selecting which of the 16 transmitter output signals supplied to the input amplifying-multiplexers 276 will be transmitted from the receiver multiplexing circuit 184 are supplied, via the transmitter-receiver selector bus 204, from the transmitter and receiver counter 202, included in the digital interface card 168, to the opto-isolator 282 included in the receiver multiplexing circuit 184. Consequently, the output signal from the same receiver 104 is transmitted from the receiver multiplexing circuit 184 throughout the entire interval during which the AI board 164 maintains the signal on the data sampling control signal line 212 and collects all 1024 data samples for each pulse of ultrasound. The change of signals that occurs on the transmitter-receiver selector bus 204 when the AI board 164 completes its data collection causes the receiver multiplexing circuit 184 to immediately select the output signal from a different ultrasonic receiver 104 for transmission from the output amplifying-multiplexer 302. Accordingly, proper arrangement of the ultrasonic transmitters 94 and receivers 104 results in the coordinated operation of the transmitter selector circuit 182 to excite one ultrasonic transmitter 94 and produce a pulse of ultrasound while the receiver multiplexing circuit 184 simultaneously transmits the output signal from the ultrasonic receiver 104 with which that transmitter 94 is paired.

The output signal from the output amplifying-multiplexer 302 included in the receiver multiplexing circuit 184 is applied via a receiver multiplexer output signal line 306 to an input of a receiver signal conditioning circuit 312. Within the receiver signal conditioning circuit 312, that signal is applied directly to an input 314 of an amplifying-multiplexer 316. Three series connected resistors 322, 324 and 326 are connected between the inputs 314 of the amplifying-multiplexer 316 and circuit ground with the respective junctions of the resistors 322-324 and 324-326 being connected to other inputs to the amplifying-multiplexer 316. Accordingly, successively smaller fractions of the output signal from the receiver multiplexing circuit 184 are respectively applied to the inputs of other amplifiers included in the amplifying-multiplexer 316. Also connected to another input of the amplifying-multiplexer 316 is the output of a precision sine wave voltage reference 328. Selection of the precision sine wave voltage reference 328 allows the computer 122 to test and calibrate the operation of the receiver signal conditioning circuit 312.

Control signals are applied to the amplifying-multiplexer 316 from an opto-isolator 332 via an input signal selection bus 334. Referring now to FIG. 4, the opto-isolator 332 included in the receiver signal conditioning circuit 312 receives control signals from the digital interface card 168 via a signal conditioning control signal bus 336. The digital interface card 168 receives those same control signals from the computer 122 via the multi-signal bus 166. Referring again to FIG. 6, consequently, the computer 122 is able to directly select as the output signal from the amplifying-multiplexer 316 three different gains for the output signal from the receiver multiplexing circuit 184, or the output signal from the precision sine wave voltage reference 328.

The output signal from the amplifying-multiplexer 316 is applied to the input of a bandpass filter circuit 342 that includes an amplifier 344. The bandpass filter circuit 342 has a center frequency of approximately 40 KHz, a bandwidth of 4 KHz, a gain of 80, a damping ratio of 0.498 and a Q of 10. Because a significant time interval elapses between the end of data collection for one pulse of ultrasound by the AI board 164, at which time the receiver multiplexing circuit 184 switches from one ultrasonic receiver 104 to another receiver 104, and the beginning of data collection for the next pulse of ultrasound, all significant ringing in the bandpass filter circuit 342 decays before data collection begins for the subsequent ultrasonic pulse.

The output signal from the bandpass filter circuit 342 is applied to the input of a logarithmic amplifier circuit 346 that includes an amplifier 348. The logarithmic amplifier circuit 346 permits the tire apparatus 20 to operate with output signals from the ultrasonic receivers 104 which differ widely in amplitudes. Accordingly, the logarithmic amplifier compensates for variations among the performances of the ultrasonic transmitters 94 and the ultrasonic receivers 104. In addition, the logarithmic amplifier circuit 346 allows the apparatus 20 to test individual tires 34 that have walls 72 which differ greatly in thicknesses including thickness variations due to tread pattern present on the tire 34, and to test various types of tires 34 having widely differing thicknesses.

The output signal from the logarithmic amplifier circuit 346 is applied to an adjustable gain, adjustable offset, clipping amplifier 352. During assembly of the testing apparatus 20, the gain and offset of the amplifier 352 are adjusted to compensate for variations in the performance of other portions of the circuits 244, 184 and 312. During operation of the apparatus 20 to test tires, the amplifier 352 passes only a single polarity of the output signal from the logarithmic amplifier 346. The unipolar output signal transmitted by the amplifier 352 is applied as an input signal to a unity gain buffer amplifier 354. As depicted in FIG. 4, the amplifier 354 transmits an output signal over an analog input signal line 356 through a low pass filter 357, having a cutoff frequency of 120 KHz, a gain of 1.0 and a damping ratio of 1.0, and to the analog input of the AI board 164 included in the computer 122.

As depicted in FIG. 4, the receiver array 102, the receiver pre-amplifier circuit 244, the receiver multiplexing circuit 184, and the receiver signal conditioning circuit 312 are all preferably enclosed within the wall 72 of the pressurized tire 34. This physical isolation of these various components reduces the effects of both acoustical and electrical noise on the operation of the testing apparatus 20. The effects of such acoustical and electrical noise can be very deleterious since the normal operating gain of the circuits 244, 184 and 312 during pulsed ultrasound testing is approximately 40,000. Enclosing the receiver array 102 within the tire 34 reduces the effect of acoustical noise because the inflated wall 72 of the tire 34 significantly attenuates ambient acoustical noise from adjacent equipment. The effect of electrical noise is reduced because there are only short distances between the ultrasonic receivers 104 and the various electronic circuits 244, 184 and 312. Furthermore, the use of the opto-isolators 283 and 332 prevents electrical ground loops.

The following table identifies the various different types of electrical components used in the digital interface card 168, the transmitter selector circuit 182, the receiver pre-amplifier circuit 244, the receiver multiplexing circuit 184, and the receiver signal conditioning circuit 312 as described above.

| Component | Type | Where Used |
| --- | --- | --- |
| Counter | 74LS169 | Encoder Counter 192 |
| Flip-Flop | 74LS74 | |
| Counter | 4516BC | Transmitter and Receiver Counter 202 |
| Multi-vibrator | 4528BC | Multi-vibrator 214 |
| Transistor | 2N3904 | Inverter 218 |
| Multiplexer | 74154 | Transmitter Selector Multiplexer 206 |
| Inverter | 7404 | Inverter 222 |
| Transistor | 2N6517 | Transistor 226 |
| Field Effect Transistor | 2N5484 | FET 252 |
| Amplifying-Multiplexer | HA1-2405-05 | Amplifying-Multiplexers 276, 302 and 316 |
| Opto-Isolator | ILQ1 | Opto-Isolator 282 |
| Amplifier | AD849JN | Amplifier 294 |
| Precision Sine Wave Voltage Reference | | Precision Sine Wave Voltage Reference 328 |
| Opto-Isolator | ILD1 | Opto-Isolator 332 |
| Amplifier | LM318 | Amplifiers 344, 352 and 354 |
| Amplifier | 2910 | Amplifier 348 |

Tire Testing

Figure 7A:
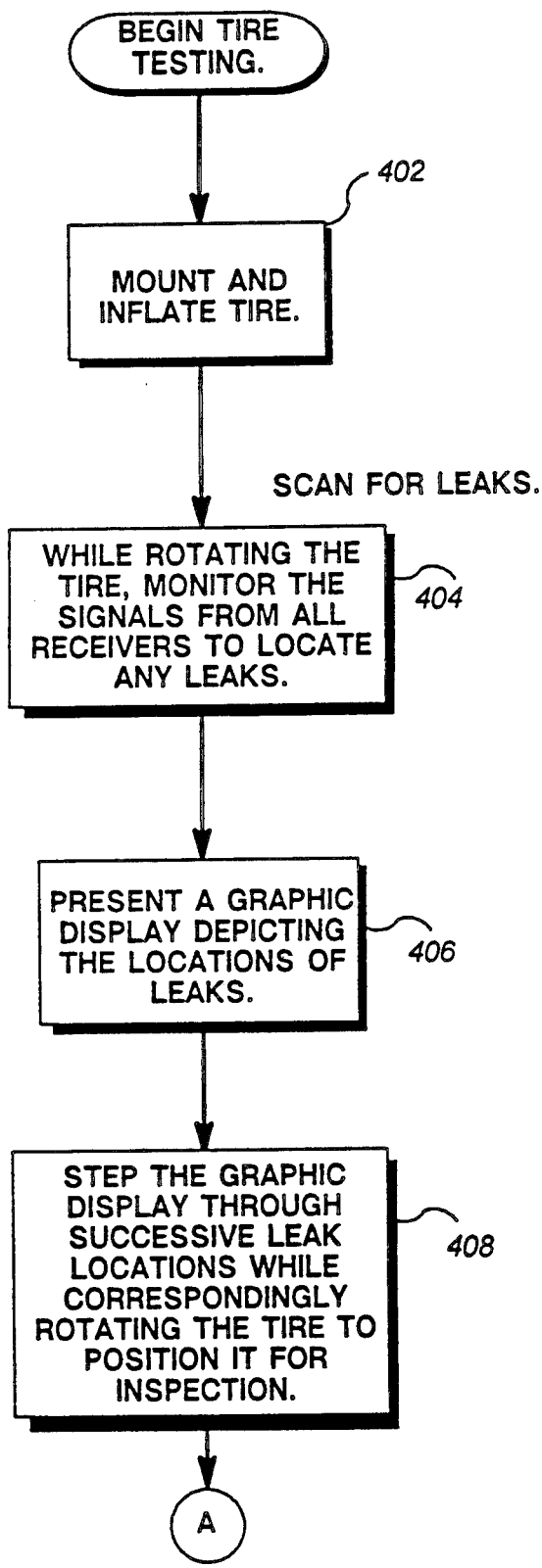
FIG. 7A and 7B are a flow chart depicting the steps performed by the tire testing apparatus of FIG. 1 in testing a tire including data acquisition during pulsed ultrasonic tire testing, analysis performed on that data to identify defective areas of the tire, and graphic display of the results of that analysis.
Figure 7B:
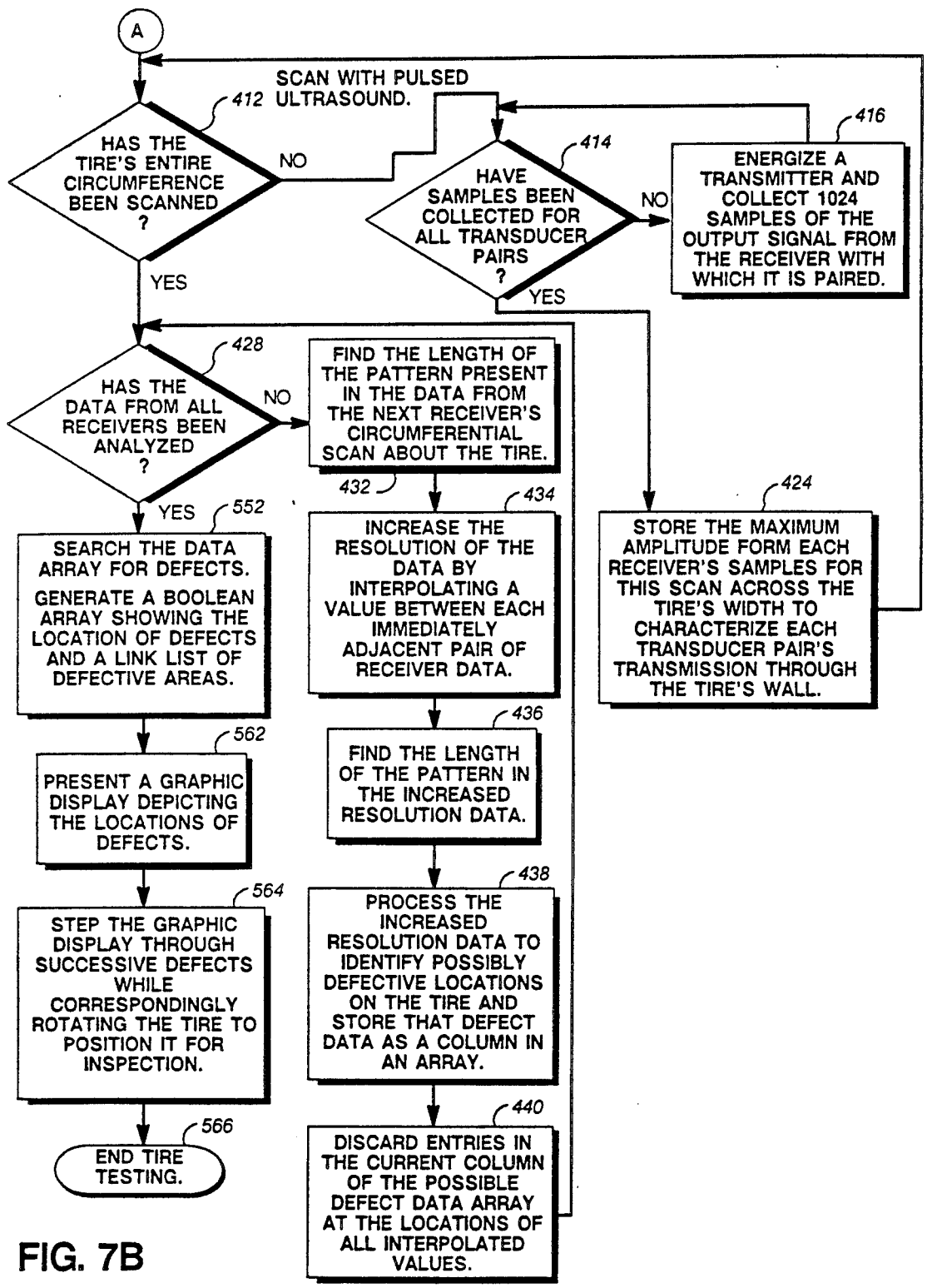

Referring now to FIG. 7A and 7B, depicted there are the various steps performed by the computer 122 in testing a tire 34. As depicted in FIG. 7A, testing a tire 34 begins with a processing step 402 in which the tire 34 is mounted on the testing apparatus 20 and inflated. After the tire 34 has been mounted and pressurized, it is then scanned for leaks. Scanning for leaks must be performed first because even a very small leak can produce significant quantities of acoustical energy at the 40 KHz operating frequency of the testing apparatus 20. If a leak is found in the tire 34, it must be repaired before continuing on to pulsed ultrasonic testing.

Testing a tire 34 for leaks involves three major processing steps. A first processing step 404 in leak detection involves monitoring the signals from all 16 ultrasonic receivers 104 while rotating the pressurized tire 34. The ultrasonic transmitters 94 are not energized while the output signals from the ultrasonic receivers 104 are being monitored for a leak. Because some leaks may produce prodigious amounts of acoustical energy at 40 KHz, the signals from the ultrasonic receivers 104 may be so large that they saturate the receiver signal conditioning circuit 312 if the testing apparatus 20 is operating at its maximum gain of 40,000. Saturation of the circuit 312 may prevent the testing apparatus 20 from determining the location of a leak. Accordingly, if the receiver signal conditioning circuit 312 saturates, then the computer 122 selects a lower gain with the amplifying-multiplexer 316.

Testing a tire 34 for leaks also involves a processing step 406 of presenting a graphic display of the location of leaks if any are found, and a processing step 408 of stepping the graphic display through the location of all the leaks that have been found. Since the operations performed in processing steps 406 and 408 as well as the signal processing operations involved in processing step 404 will become apparent during the following discussion of pulsed ultrasonic testing, no further description of those steps will be presented.

Testing for Defects with Pulsed Ultrasound

After a tire 34 has been satisfactorily tested for leaks, it is then tested for defective areas using pulsed ultrasound according to the process set forth in FIG. 7B. As shown there, to collect data for the entire circumference of the tire 34, a decision step 412 continues the application of pulses of ultrasound until the entire circumference of the tire 34 has been processed. This data is collected by a sequence of successive scans across the width of the tire 34.

As described above, collecting data from the 16 ultrasonic receivers 104 for a single scan across the width of the tire 34 is initiated by an interrupt from the encoder counter 192. In response to an interrupt from the encoder counter 192, a decision step 414 repetitively executes a processing step 416 that activates the AI board 164 to energize an ultrasonic transmitter 94 and collect 1024 samples of the output signal from the ultrasonic receiver 104 with which the transmitter 94 is paired. The decision step 414 causes processing step 416 to be executed repetitively until data has been collected from all 16 receivers 104 across the width of the tire 34.

Figure 8:
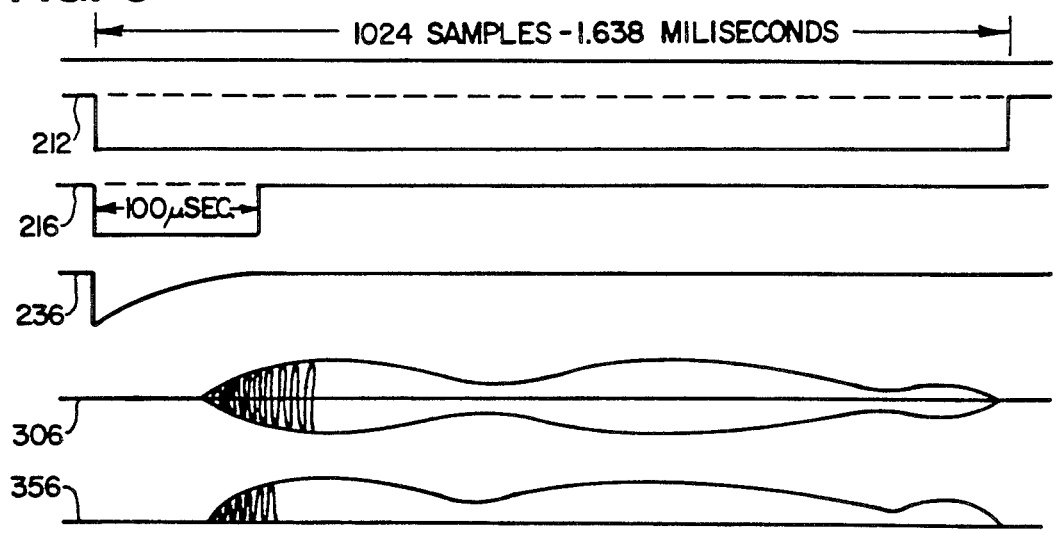
FIG. 8 is a circuit diagram depicting a portion of the digital interface card and the transmitter selector circuit illustrated in FIG. 4.

FIG. 8 illustrates the timing for single pulse of ultrasound applied to the tire 34 during processing step 416 by the combination of the digital interface card 168, the transmitter selector circuit 182 and the ultrasonic transmitters 94. After multi-vibrator 214 transmits its 100 microsecond long pulse on the pulse interval signal line 216 in response to the signal from the AI Board 164 on the data sampling control signal line 212, there is a delay required for transmission of ultrasound from the transmitter 94 through the wall 72 of the tire 34 to the receiver 104 before the signal on the receiver multiplexer output signal line 306 responds to the ultrasound pulse. The signal and its envelope shown for the receiver multiplexer output signal line 306 depicted in FIG. 8 is only illustrative. The shape of the signal present on the line 306 varies greatly among the 16 receivers 94 during a single scan across the width of the tire 34 and varies for a single receiver 104 throughout the circumference of the tire 34. Approximately every 1.6 milliseconds for a comparatively long time after the pulse of ultrasound is generated, the AI board 164 repetitively converts the signal from the ultrasonic receiver 104 present on the analog input signal line 356 into a digital number storing that number into a memory located on the AI board 164. Since the AI board 164 collects 1024 samples of the signal from the ultrasonic receiver 104 at a sampling frequency of 625 KHz, more than 10 samples of the ultrasound are collected during each period of the 40 KHz signal produced by the ultrasonic transmitter 94, and data for approximately 65 periods of that 40 KHz signal are collected.

As the AI board 164 collects data for each pair of transmitters 94 and receivers 104, that data is initially stored in a local buffer within the AI board 164. After all 1024 samples have been collected by the AI board 164, the program executed by the computer 122 then moves that data from the AI board 164 into the memory of the computer 122 before commencing data collection for the next pair of transmitters 94 and receivers 104. The time interval required for this data transfer between the AI board 164 and the computer 122 is the interval which allows all significant ringing in the bandpass filter circuit 342 to decay before data collection begins for the subsequent ultrasonic pulse. After the data has been transferred from the memory of the AI board 164 to the memory of the computer 122, the computer 122 immediately activates the AI board 164 to collect data for the next pair of transmitters 94 and receivers 104.

Figure 9:
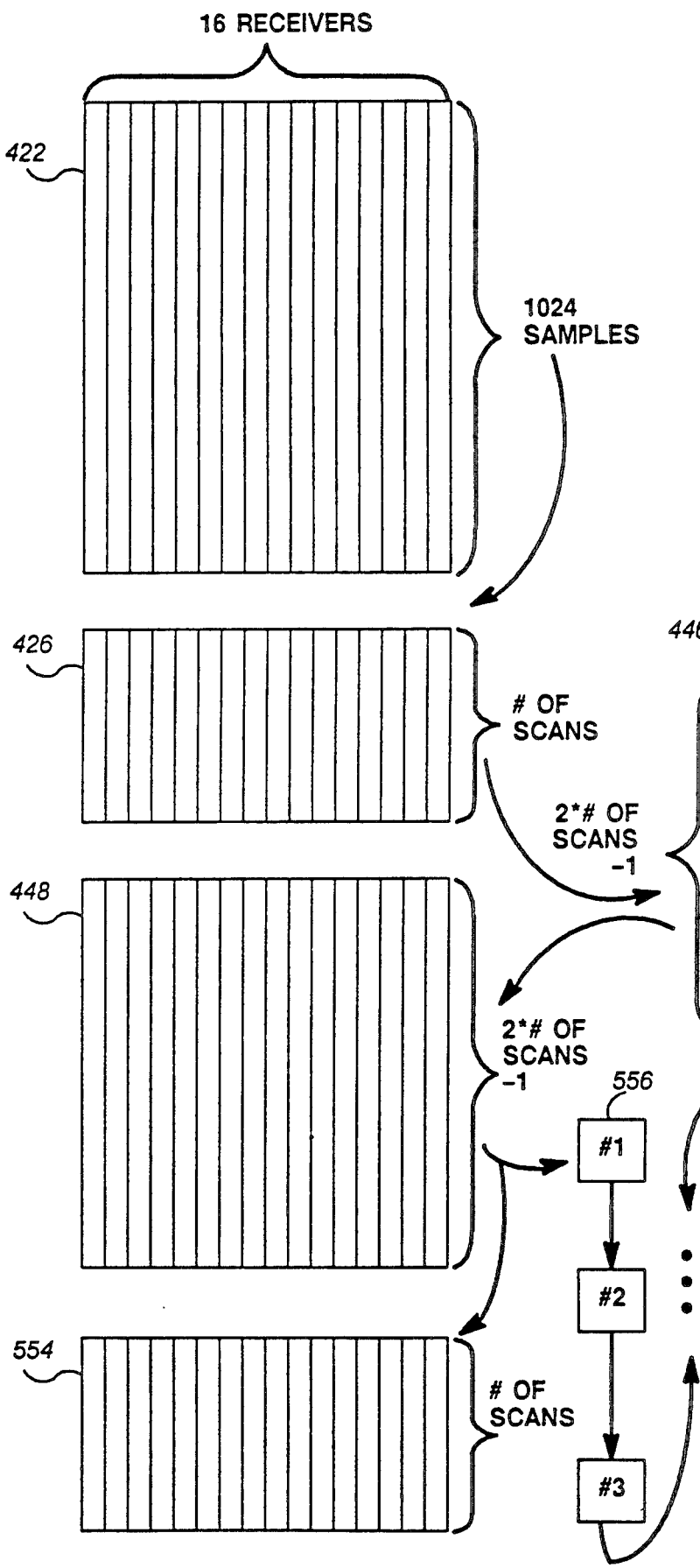
FIG. 9 is a diagram depicting various different structures used for the storage of data by the computer of FIG. 1 in executing the program depicted in FIGS. 7A-B.

After data has been collected for all 16 ultrasonic receivers 104 and moved from the memory on the AI board 164 to the memory of the computer 122, the data is stored in an array 422, illustrated in FIG. 9, having 16 columns, one for the data from each ultrasonic receiver 104. With the data now stored in the array 422, the program executes a processing step 424 to select only one data value, the maximum amplitude for each receiver, for storage into an array 424 also illustrated in FIG. 9. In searching the data stored in the array 422, the computer program begins with the 125 because of the delay required for the ultrasound to pass from the transmitter 94 through the wall 72 of the tire 34 to the receiver 104. By transferring this single number for each of the 16 receivers 104 from the array 422 to the array 426, the computer program characterizes the transmission of ultrasound through the wall 72 of the tire 34 for all 1024 samples collected for each of the 16 receivers 104.

After the maximum values have been selected from the data for all 16 ultrasonic receivers 104 and stored, the computer 122 transmits the signal from the DIO board 162 via the clear the encoder interrupt signal line 240 which resets the flip-flop included in the encoder counter 192. When the encoder counter sends the next signal to the DIO board 162 over the encoder interrupt signal line 194, the computer repeats the preceding process of scanning all 16 pairs of transmitters 94 and receivers 104 across the width of the tire 34. This repetitive scanning of across the width of the tire 34 continues until scans have been performed completely around the circumference of the tire 34 and the array 426 is filled with data.

While the preceding program for the collection of data illustrated by the steps 412, 414, 416 and 424 in FIG. 7B is depicted there as being executed as part of the program's logical flow, this data collection process is actually performed by an interrupt routine established for that specific purpose. While this interrupt routine is established, the main program continues running in a polling loop waiting for the interrupt routine to collect the data for the entire tire 34. Thus, the combined execution of the interrupt routine and the polling by the main program effects the operation depicted in FIG. 7B.

Searching the Data for Defective Areas

As depicted in FIG. 7B, after the data has been collected for the entire tire 34, the computer program executes a decision step 428. Decision step 428 causes the computer program to repetitively process the data for each of the receivers 104 that is stored in each of the columns in the array 426 through processing steps 432, 434, 436, 438 and 440.

Because the effect of tread pattern on the signal from one receiver 104 may differ greatly from immediately adjacent receivers 104 on either side, the signals from each of the receivers 104 are analyzed independently one after another. The data for each receiver 104 is processed as an elongated continuous strip from the data for the first scan along the circumference of the tire 34 to the data for the last scan. Furthermore, the data for each tire 34 is processed the same whether or not it actually has a tread pattern, i.e., whether or not the tire 34 has been buffed. It has been discovered that the ultrasound transmission data for buffed tires 34 frequently exhibits a pattern apparently due to the internal structure of the tire 34.

In processing step 432, the computer program finds the length of the pattern present in the data in a single column of the array 426. Having found the length of the pattern, the program then increases the resolution of the data in processing step 434 by computing a value between each pair of data in the array 426 and storing both the actual data and the interpolated values intermixed into an vector 446 illustrated in FIG. 9. Thus, the vector 446 contains one fewer data value than twice the number of scans. The computer program uses a standard cubic spline routine to compute the interpolated values in processing step 434.

In processing step 436, the computer program computes the length of the pattern in the increased resolution data in the vector 446. Having found the pattern length in the increased resolution data, the computer program then identifies possibly defective locations on the tire 34 by searching the increased resolution data in the vector 446 and stores data that indicates the possibility of a defect in a column of an array 448. Having stored data that indicates the possibility of a defect into a column of the array 448, in processing step 440 the computer program then compresses the entries in the column of the array 448 for the present receiver 104 discarding the values at those locations where interpolated values were computed in evaluating the vector 446.

Finding the Pattern Length

Figure 10:
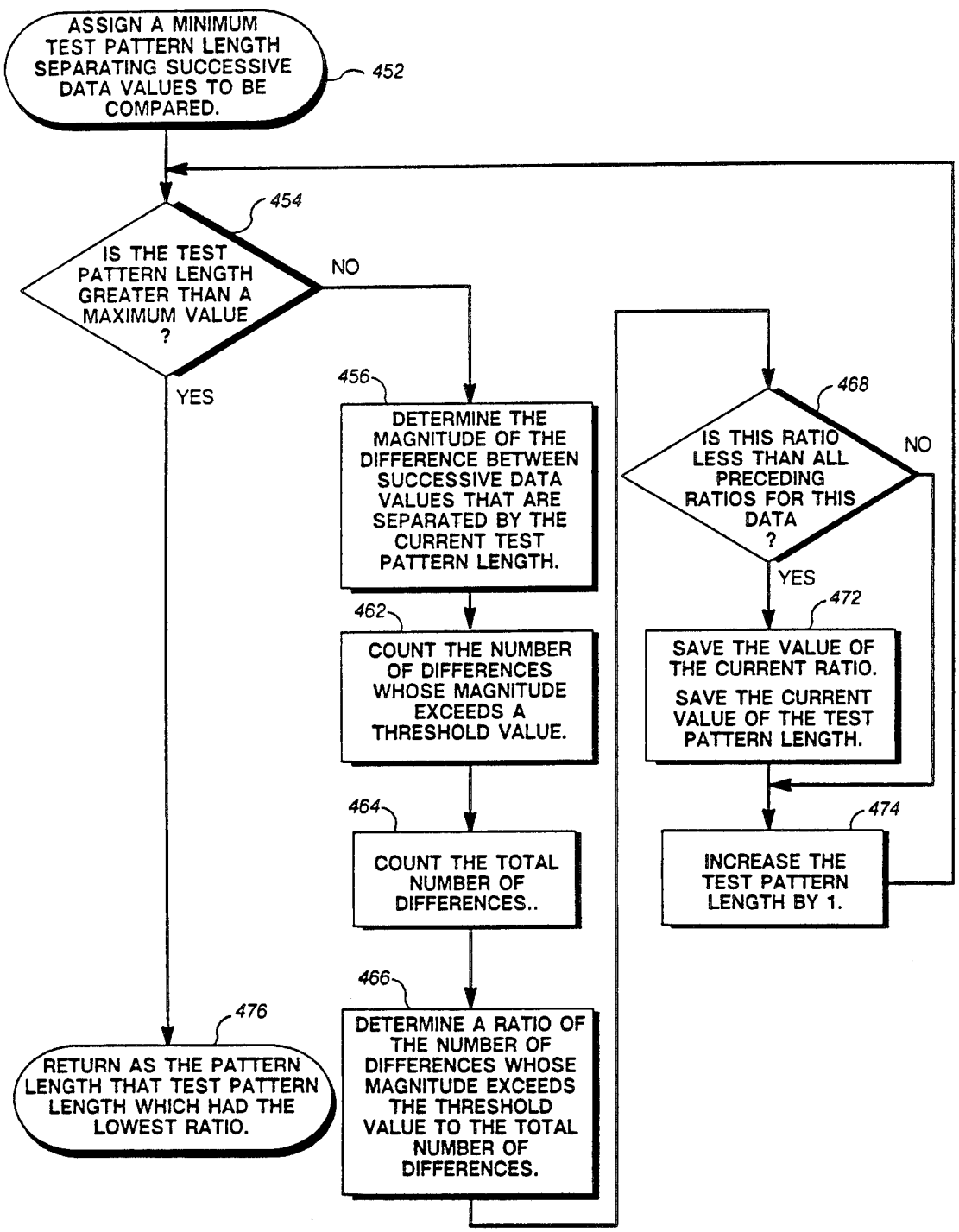
FIG. 10 is a flow chart depicting steps performed to find a pattern in the pulsed ultrasound data during the data analysis illustrated in FIG. 7B.

As depicted in the flow chart in FIG. 10, finding a pattern in the data for a receiver 104, processing steps 432 and 436 in FIG. 7B, begins with an initiation step 452. In initiation step 452, a minimum test pattern length, such as the value 5, is assigned to be used for initially comparing values of the data from the receiver 104. If the present test pattern length does not exceed a maximum value, a decision step 454 causes the data for the receiver 104 to be processed using the present test pattern length.

Figure 11:
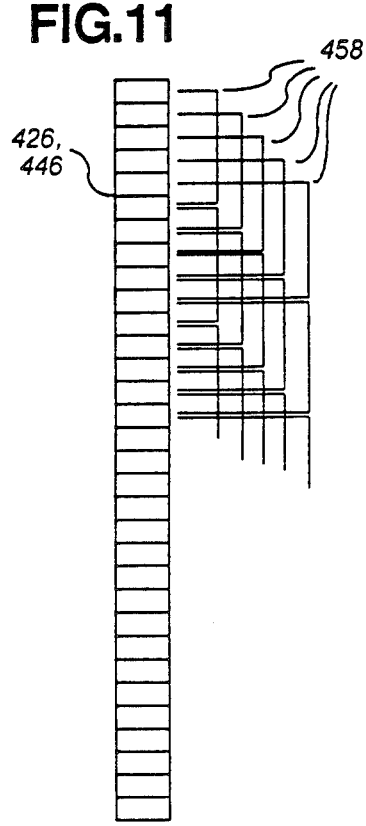
FIG. 11 is a diagram depicting the selection of data values for the determination of pattern length as illustrated in FIG. 10.

In a processing step 456, the computer program determines the magnitude of the difference between successive values in the data that are separated by the current test pattern length. FIG. 11 graphically illustrates the selection of data values used in determining the magnitude of their difference when the test pattern length is 5. As illustrated by each U-shaped lines 458 in FIG. 11, the magnitude of the difference between data values 5 locations apart is determined. Thus, for example, the magnitude of the difference between data values 1 and 6, data values 2 and 7, data values 3 and 8, etc. are determined. The magnitude of the difference between the data values is determined by computing the absolute value of the difference between the data values.

Having determined the magnitude of the differences between the data values for the present pattern length, those magnitudes are then compared in a processing step 462 to determine if they exceed a threshold value. The threshold value with which each magnitude is compared is the sum of a constant value, that represents the overall system noise for the apparatus 20, plus 2% of the value of the first data of the pair for which the magnitude was determined. Thus, the threshold with which each magnitude is compared depends upon the value of the data for which the magnitude was computed. A processing step 464 counts the total number of magnitudes that are computed in processing step 456.

In a processing step 466, the program executed by the computer 122 computes a ratio of the two counts accumulated respectively in processing steps 462 and 464. This ratio must always be 1.0 or less and can never be less than 0.0. The ratio computed in processing step 466 is then compared in a decision step 468 with the minimum value for that same ratio determined for preceding values of the test pattern length. If the ratio for the present test pattern length is less than the ratio for all preceding test pattern lengths, then the present ratio and the present test pattern length are saved in a processing step 472.

If a pattern exists in the data for a receiver 104, then the difference between data values separated by the length of that pattern will, on the average, tend to be small. Consequently, if a test pattern length equals the actual pattern length for data from a receiver 104, there will be few differences between pairs of that data separated by the test pattern length whose magnitude exceeds some threshold value. By counting the number of differences whose magnitude exceeds a threshold value and computing the ratio of that count to the total number of differences, the ratio thus obtained measures how poorly a test pattern length matches the pattern in the data from the receiver 104. Consequently, a high ratio indicates that the test pattern length does not match the pattern length in the data while a lower ratio for a test pattern length indicates a better match for the data's pattern length.

Whether or not the ratio and the test pattern length are saved in processing step 472, the computer program then increases the test pattern length by one in a processing step 474 and returns to processing step 454. In processing step 454, the computer again tests the new, longer test pattern length to determine whether or not it exceeds the maximum allowed test pattern length. If the test pattern length exceeds the maximum allowed, the computer program then executes a terminator step 476 and returns the last value of the pattern length stored in processing step 472 to the calling procedure as the pattern length for the data being processed for the current receiver 104.

The process of finding the pattern length remains the same whether a pattern is being found directly in the data from the receiver 104 as stored as a column in the array 426 or it is being found in the increased resolution data stored in the vector 446. The only difference Between finding patterns for the data stored in the array 426 and the vector 446 are the minimum and maximum values of the test pattern length. Because an approximate pattern length is already known for the increased resolution data stored in the vector 446, ratios for only a few test pattern lengths must be compared to obtain the pattern length for the increased resolution data.

Identifying Possibly Defective Areas

Figure 12A:
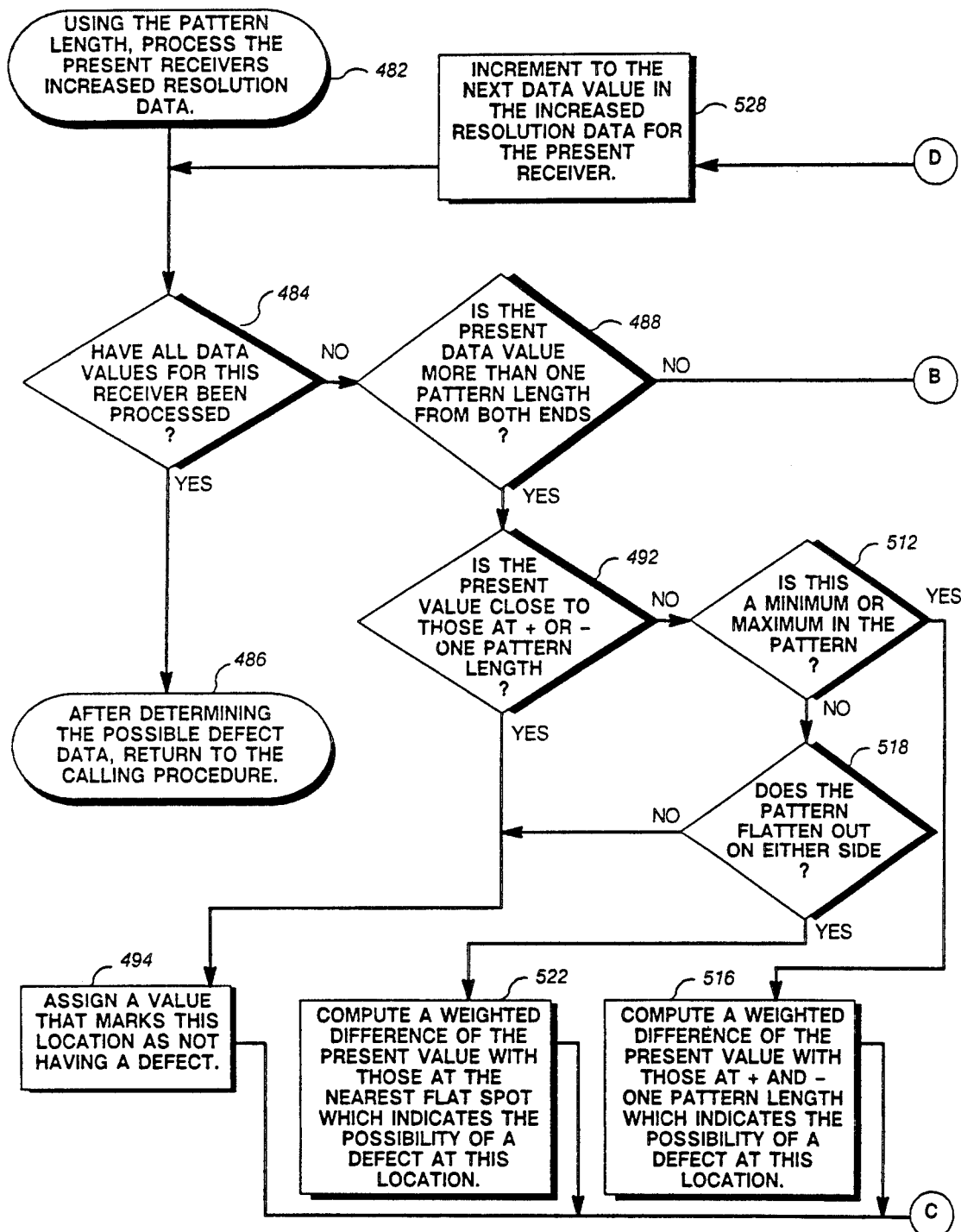
FIG. 12A and 12B are a flow chart depicting the data analysis steps of FIG. 7B that are performed to find possibly defective locations of the tire.
Figure 12B:
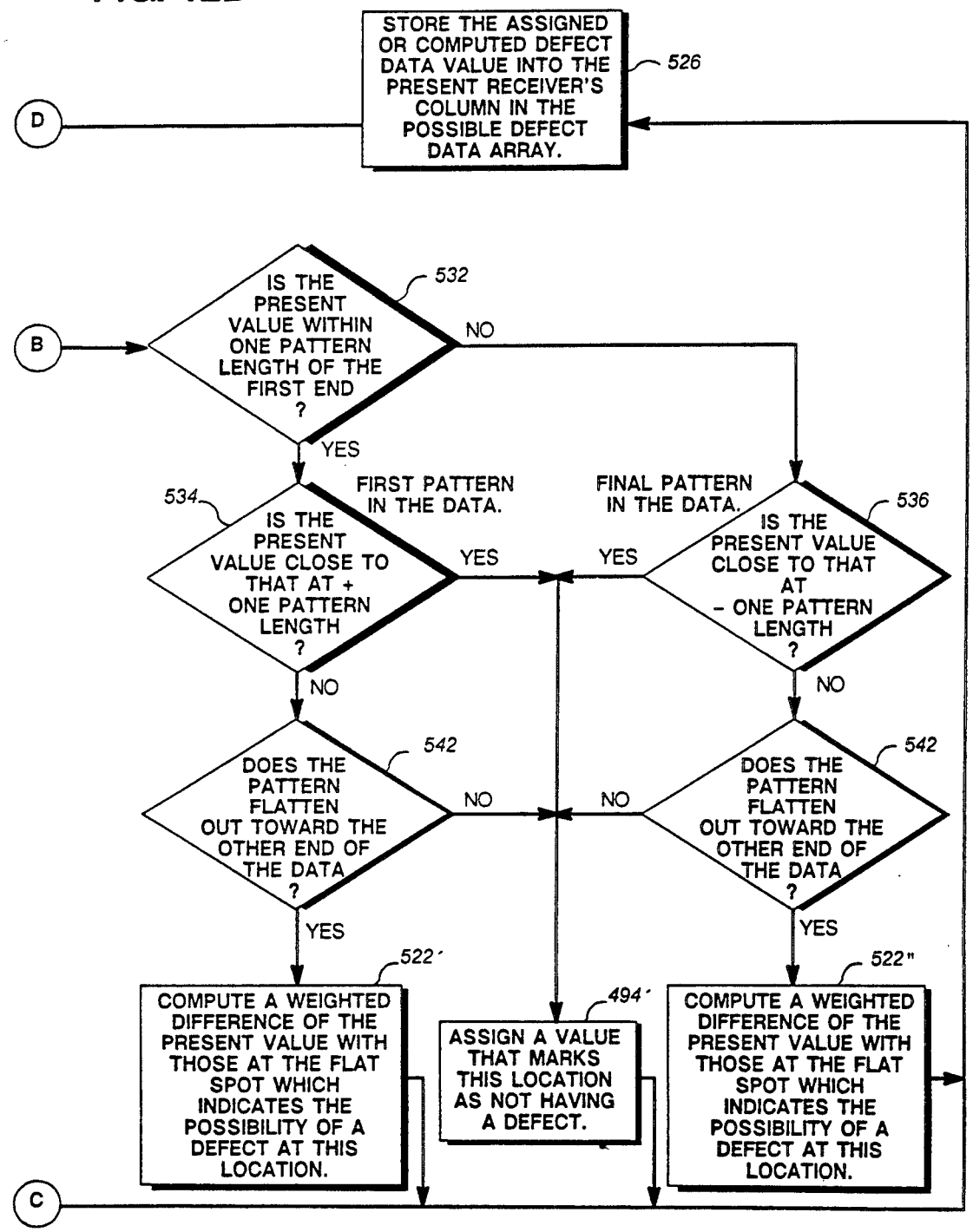

FIG. 12A and 12B depict the steps that are performed in identifying possibly defective locations on the tire 34 as shown in processing step 438 in FIG. 7B. Finding possibly defective locations on the tire 34 begins with a terminator step 482. The terminator step 482 requires that the present pattern length be used in processing the increased resolution data to identify the location of possible defects. Identifying the location of possible defects begins with the first location in the vector 446. A decision step 484 immediately following the terminator step 482 requires that all data values in the increased resolution data stored in the vector 446 must be processed before returning to the calling procedure at a terminator step 486. Thus all locations in the vector 446 beginning with the first and ending with the last are processed through decision step 484.

If all of the data in the vector 446 has not been processed, then decision step 484 causes a decision step 488 to be executed. Decision step 488 determines whether the present location is within one pattern length of either end of the vector 446. If the present value is not within one pattern length of either end of the vector 446, then a decision step 492 is executed. The decision step 492 compares the value in the present location in the vector 446 with both of those values one pattern length on either side of the present location. Thus, if the pattern length in the increased resolution data was found to be 20 and the present location was 40, the value at location 40 would be compared both with the value at location 20 and with the value at location 60.

Analogous to the process of finding a pattern length in the data, in decision step 492 the computer program computes the magnitude of both the differences between the value of the data at the present location in vector 446 and the values one pattern length on either side of the present location. Having computed the magnitude of these two differences by taking their respective absolute values, the program then compares those magnitudes with a threshold value. In a manner analogous to the finding of a pattern length, the threshold value with which each magnitude is compared is the sum of a constant value, the assigned defect level for the testing apparatus 20, plus 2% of the value of the data at the present location. Thus again, the threshold with which each magnitude is compared depends upon the value of the data for which the magnitude was computed. If either of these two magnitudes is less than the threshold value, a value is assigned in a processing step 494 for storage in the array 448 which marks this location in the vector 446 as not having a defect, i.e. a zero value is assigned for storage into the array 448.

Figure 13A:
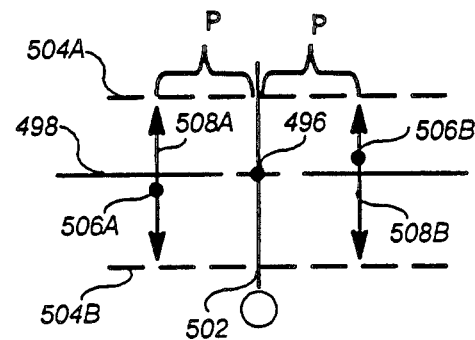
FIG. 13A and 13B depict various relationships among the data values that are used in finding possibly defective locations of the tire by the procedure shown in FIG.12A-B.

FIG. 13A graphically depicts the conditions under which decision step 492 will cause processing step 494 to be executed. In FIG. 13A a dot 496 represents the data at the present location. A horizontal line 498 indicates the value of the data and a vertical line 502 extending upward above the number 0 indicates the data's location within the vector 446. Horizontal dashed lines 504A and 504B represent the respective threshold levels above and below the value depicted by the line 498 against which the magnitudes will be compared. If a data value illustrated by a dot 506A one pattern length "P" below (−) the current data location lies along a vertical double headed arrow 508A extending between the upper threshold 504A and the lower threshold 504B or if a data value illustrated by a dot 506B one pattern length "P" above (+) current data location lies along a vertical double headed arrow 506B also extending between the upper threshold 504A and the lower threshold 504B, then decision step 492 causes processing step 494 to be executed.

Thus, for locations more than one pattern length from the ends of the vector 446, if the data values one pattern length on either side of the present location are within plus or minus the threshold value, the present location is marked as not having a defect. Thus, the present location will be marked as not having a defect if the slope to either of the data values one pattern length on either side of the present location is sufficiently flat.

Referring again to FIG. 12A, if the respective slopes to both data values one pattern length on either side of the present location are insufficiently flat, decision step 492 causes another decision step 512 to be executed. Thus, decision step 512 is executed only if decision step 492 determines that the two magnitudes are both greater than the threshold value in decision step 492.

Figure 13B:
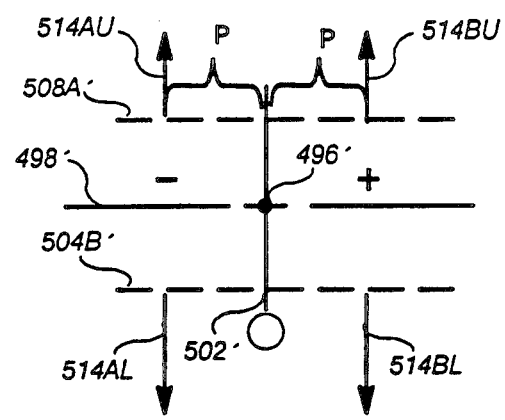

FIG. 13B depicts the condition under which decision step 512 is executed. Items identified by reference numbers in FIG. 13B having a "'" designation are the same as those identified by that same reference number in FIG. 13A. For decision step 512 to be executed, the data value one pattern length "P" below (−) the current data location must lie either along a vertical arrow 514AU pointing upward above the upper threshold 504A' or must lie along a vertical arrow 514AL pointing downward below the lower threshold 504B', and the data value one pattern length "P" above (+) current data location must also lie either along a vertical arrow 514BU pointing upward above the upper threshold 504A' or along a vertical arrow 514BL pointing downward below the lower threshold 504B'. Consequently, decision step 512 can be executed only if the present location is on a slope in the data values extending from somewhere on the upper arrow 514AU down through the dot 496' to somewhere on the lower arrow 514BL, on a slope in the data values extending from the lower arrow 514AL upward through the dot 496' to somewhere on the upper arrow 514BU, at the nadir of a "V" in the data values with the other two data values respectively lying somewhere on the upper arrows 514AU and 514BU, or at the peak of an inverted "V" with the other two data values respectively lying somewhere on the lower arrows 514AL and 514BL.

Referring again to FIG. 12A, decision step 512 determines whether or not the data value at the present location is a minimum or a maximum by determining whether the magnitude of the difference between the two data values one pattern length below (−) and one pattern length above (+) the present location exceeds the same threshold as that used in decision step 492. If the magnitude of this difference does not exceed that threshold, then a processing step 516 is executed. Consequently processing step 516 is executed only if the present location is a minimum or a maximum in the data values with respect to those one pattern length below (−) and one pattern length above (+) the present location and only if the slope between the data values one pattern length below (−) and one pattern length above (+) is sufficiently flat. If processing step 516 is executed, then the following value is computed for assignment to the current location in the array 448.

abs ((value at the current location) −

((value one period (−) below the current location) +

(value one period (+) above the current location))/2)

If the present location is not a minimum or a maximum in the data values with respect to those one pattern length below (−) and one pattern length above (+) the present location, or if it is a minimum or a maximum but there is an excessive slope between the data values one pattern length below (−) and one pattern length above (+), then decision step 512 causes a decision step 518 to be executed.

Decision step 518 causes the magnitude of the difference between successive pairs of data values in the vector 446 at locations that are separated by one pattern length and that are offset by multiple pattern lengths with respect to the present location to be compared successively one after another with a threshold value. For example, for the prior example in which the pattern length in the increased resolution data was found to be 20 and the present location was 40, depending upon the actual data values decision step 518 could cause the magnitude of the difference to be compared with a threshold value for the following data locations.

| Locations | Threshold |
| --- | --- |
| 60–80 | assigned defect level + 2% of data value at location 60 |
| 80–100 | assigned defect level + 2% of data value at location 80 |
| 100–120 | assigned defect level + 2% of data value at location 100 |
| 120–140 | assigned defect level + 2% of data value at location 120 |
| . | . |
| . | . |
| . | . |

So long as the magnitude of the difference at each of these successive locations is greater than the corresponding threshold, decision step 518 continues comparing the magnitudes of the differences with the corresponding threshold value for locations further and further from the present location. This process by decision step 518 halts only upon finding a difference in the data values whose magnitude is less than the threshold value, or upon reaching the limits of data in the vector 466. Furthermore, for present locations such as those described thus far that are more than one pattern length from both ends of the vector 446, the decision step 581 searches in the preceding manner both below (−) and above (+) the present location.

If decision step 518 finds a magnitude that is less than the corresponding threshold value, i.e. finds a flat spot, the program then executes a processing step 522. Processing step 522 computes a weighted difference of the data value at the present location with those at the flat spot for assignment to the current location in the array 448. If flat spots are found in both directions from the present location, the weighted difference for the nearest one is computed for assignment to the current data location in the array 448. The value which is computed for assignment to the current location in the array 448 if decision step 518 finds a flat spot is as follows.

abs ((value at the current location) −

((value at nearer location in the flat spot) +

((value at farther location in the flat spot)/2)))

If decision step 518 fails to find a magnitude that is less than the corresponding threshold value, i.e. fails to find a flat spot, the program then executes processing step 494. As described previously, processing step 494 assigns a value that marks this location in the array 448 as not having a defect, i.e. assigns a zero value for storage into the array 448.

As illustrated in FIG. 12A and 12B, for present locations such as those described thus far that are more than one pattern length from the ends of the vector 446, after executing processing steps 494, 516 or 522 the computer program executes a processing step 526. In processing step 526, the value assigned in processing step 494 or either of the weighted differences computed in processing steps 516 or 522 are stored into the present location in the array 448. After storing the data value into the array 448 in processing step 526, the computer program executes a processing step 528 which increments to the location of the next data value in the increased resolution data present in the vector 446.

After incrementing to the location of the next data value, the computer program again executes decision step 484 to determine if all the data values in the vector 446 have been processed. As discussed previously in connection with decision step 484, if all data values have not been processed then decision step 488 is executed. If the present location is within one pattern length from either end of the vector 446, then decision step 488 causes a decision step 532 to be executed rather than decision step 492. Decision step 532 determines whether the present location is within one pattern length of the first end of the vector 446. If the present location is within one pattern length of the first end of the vector 446, then the present location is within the first pattern in the data and a decision step 534 is executed. If the present location is not within one pattern length of the first end of the vector 446, then it must be within one pattern length of the final pattern in the vector 446 and a decision step 536 is executed.

Decision step 534 is analogous to decision step 492 except that only the magnitude of the difference with the data value one pattern length above (+) the current location is compared with the threshold value. Analogously, decision step 536 is similar to decision step 492 except that the magnitude of the difference with the data value one pattern length below (−) the current location is compared with the threshold value. The threshold value for decision steps 534 and 536 are determined in precisely the same manner as the threshold value for the decision step 492. As with decision step 492, if decision steps 534 or 536 find that the respective slopes to the respective data values one pattern length above (+) or below (−) the present location are sufficiently flat, a processing step 494' identical to processing step 494 is executed.

Conversely, if decision steps 534 or 536 find that the respective slopes to the respective data values one pattern length above (+) or below (−) the present location are excessive, decision steps 542 or 544 are executed. Decision steps 542 and 544 are analogous to decision step 518 except that rather than searching in both below (−) and above (+) the present location, decision step 542 searches only pattern lengths above (+) the present location and decision step 544 searches only pattern lengths below (−) the present location. If decision step 542 finds a flat spot above (+) the present location, then a processing step 522' analogous to processing step 522 is executed. Correspondingly, if decision step 544 finds a flat spot below (−) the present location, then a processing step 522" also analogous to processing step 522 is executed. If either decision steps 542 or 544 fails to find a flat spot, then analogous to decision step 518 processing step 494' is executed.

In the preceding manner, all values for the increased resolution data for the current receiver 104 that are stored in the vector 446 are processed using the pattern length found in processing step 436.

Defect Location and Display

Referring again to FIG. 7B, after the data for each of the receivers 104 have been processed through steps 432, 434, 436, 438 and 440, the program executed by the computer 122 executes a processing step 552. Processing step 552 searches the array 448 to which data values were assigned in processing step 438, depicted in greater detail in FIGS. 12A and 12B, and from which entries were discarded in processing step 440. As illustrated in FIG. 9, if a defect is found in the array 448, processing step 552 marks the location of the defect in a boolean array 554 and, after finding the extent of the defective area, adds another entry to a linked list 556 of defective areas.

After the boolean array 554 and the linked list 556 have been generated in processing step 552, the boolean array 554 is used in presenting a graphic display of the defect locations as described above and as illustrated in a processing step 562 in FIG. 7B. Then, in a processing step 564, both the linked list 556 and the boolean array 554 are used in stepping the graphic display through successive defects while correspondingly rotating the tire 34 to position it for inspection. As described above in connection with describing the operator console 112, inspection of the tire 34 terminates either when all defective areas have been inspected or the operator presses the finish switch 156. Either of the two preceding events will cause the program executed by the computer 122 to execute a terminator step 566 which ends tire testing.

Figure 14:
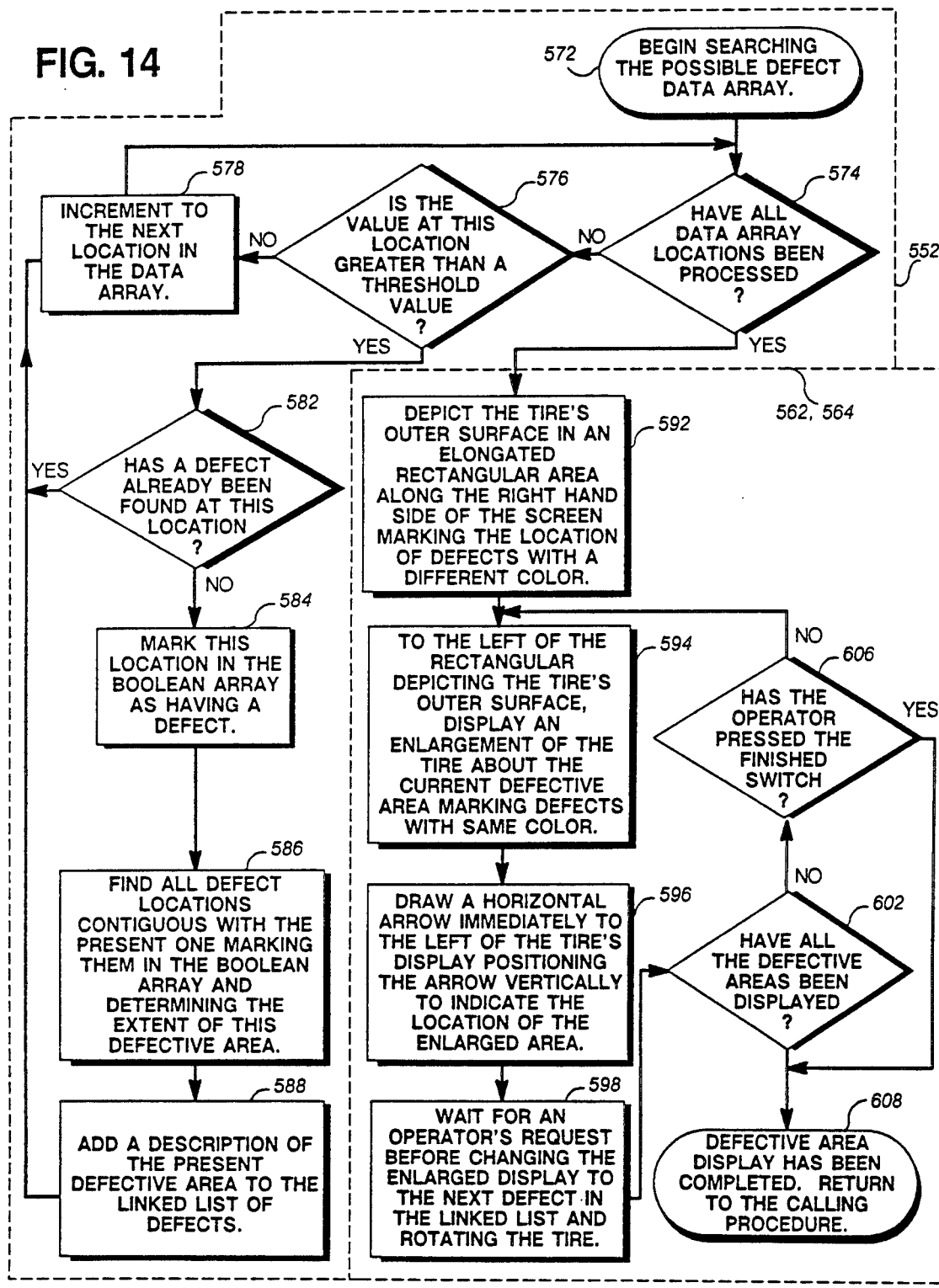
FIG. 14 is a flow chart depicting the data analysis steps of FIG. 7B that are performed to identify defective areas on the tire together with the steps performed in graphically displaying the results of that analysis.

Referring now to FIG. 14, depicted there are the various processing steps performed in processing steps 552, 562 and 564 illustrated in FIG. 7B. As depicted in FIG. 14, searching the array 448 that contains data identifying possible defects that were assigned or computed in the steps illustrated in FIGS. 12A and 12B begins with a terminator step 572. Terminator step 572 causes a decision step 574 to be executed which in turn executes another decision step 576 if all locations in the array 448 have not been processed. Decision step 576 compares the value stored in the present location in the array 448 with the assigned defect level used in the various threshold values discussed above in connection with the description of FIGS. 12A and 12B. If the current data value is less than the assigned defect level, then decision step 576 causes a processing step 578 to be executed. Processing step 578 increments to the next location in the array 448 and then returns to execute decision step 574.

However, if the current data value exceeds the assigned defect level, then decision step 576 causes another decision step 582 to be executed. Decision step 582 checks the boolean array 554 to determine if a defect has already been found at the present location in array 448. If a defect has already been found at this location, then decision step 582 also causes processing step 578 to be executed.

If a defect has not yet been found at this location, then decision step 582 commences the processing of a new defective area by causing processing step 584 to be executed. Processing step 584 marks the present location in boolean array 554 as having a defect. After processing step 548 has marked the boolean array 554, a processing step 586 is executed to find all defect locations in the array 448 that are contiguous with the present defect location. As each contiguous defect location is found in processing step 586, its location is marked in the boolean array 554 and data values are maintained that record the extent of the defect. After all contiguous defect locations have been found in processing step 586, processing step 588 is executed to add another description of the present defective area to the linked list 556. Once this description of the defective area has been added to the linked list, processing step 578 is executed to increment to the next location in the array 448.

After all locations in the array 448 have been processed, decision step 574 causes a processing step 592 included in the processing step 562 of FIG. 7B to be executed. Processing step 592 uses the data stored in the boolean array 554 to depict the tire 34 in the elongated rectangular area 136 on the CRT display 124 as described previously. Having displayed the tire3 s surface in the rectangular area 136, the program executed by the computer 122 then executes a processing step 594 to display the enlargement of the first defective area in the linked list 566 in the rectangular area 142. After the defective area has been displayed by processing step 594, processing step 596 is executed to draw the arrow 146 immediately to the left of the rectangular area 136 on the CRT display 124. Having now completed the graphic display presented to an operator of the testing apparatus 20 on the CRT display 124, as described previously the program executed by the computer 122 then waits in a processing step 598 for the operator to press the continue switch 154 or the finish switch 156.

When the operator presses either the continue switch 154 or the finish switch 156, the computer program then executes a decision step 602 which checks the linked list 556 to determine if all the defective areas have been displayed. If all the defective areas have been displayed, then decision step 602 causes a terminator step 608 to be executed which returns to the calling procedure. Conversely, if all defective areas in the linked list 556 have not been displayed, then decision step 602 causes a decision step 606 to be executed. Decision step 606 then determines if the operator has pressed the finished switch 156. If the finished switch 156 has not been pressed, then program execution returns back to processing step 594 to create a display of the next defective area in the linked list 556. Conversely, if the finished switch 156 has been pressed, then the terminator step 608 is executed and tire testing is completed.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A non-destructive method for testing a tire employing pulses of ultrasound transmitted from an ultrasonic transmitter located on one side of a tire wall to an ultrasonic receiver located on the opposite side of the tire wall, the tire wall having an outer surface and an inner surface which when sealed may be pressurized, said method comprising the steps of:

generating characterizing data from the transmission of ultrasound through the tire wall at a plurality of locations around the circumference of the tire by successively applying a series of pulses of ultrasound to the tire wall with the ultrasonic transmitter, sensing the ultrasound emanating from the tire wall with the ultrasonic receiver, and processing a signal produced by the ultrasonic receiver in response to said ultrasonic emanations;

accumulating said characterizing data for said plurality of locations distributed circumferentially around the tire;

determining a repetitive pattern present in the accumulated data; and identifying defective areas in the tire using the repetitive pattern in searching the accumulated data for such defective areas.

2. The method of claim 1, further including the following steps prior to generating said characterizing data from the transmission of ultrasound through the tire wall:

disposing the ultrasonic transmitter at a pre-established distance from the outer surface of the tire; and disposing the ultrasonic receiver at a pre-established distance from the inner surface of the tire.

3. The method of claim 2, wherein a plurality of ultrasonic receivers are arranged into an array shaped to conform to a cross-section of the inner surface of the tire wall and wherein the following steps are carried out prior to disposing the ultrasonic receiver at a pre-established distance from the inner surface of the tire wall:
  inserting the array of ultrasonic receivers into the tire toward the inner surface of said tire wall; and
  rotating the array to dispose the ultrasonic receivers across the tire between sidewalls thereof.

4. The method of claim 1, further including the steps of:
  measuring the diameter of the tire; and
  determining from the measured diameter the number of locations at which the pulses of ultrasound will be applied.

5. The method of claim 1, further including the steps of:
  sealing the inner surface of the tire; and
  pressurizing the sealed interior of the tire.

6. The method of claim 5, further including the steps of:
  processing signals from the ultrasonic receiver for a plurality of locations over the tire wall to locate air leakage through the tire wall from the pressurized interior of the tire; and
  moving the tire to a position for conveniently inspecting a location where said leakage has been identified.

7. The method of claim 1 wherein said characterizing data is generated around at each location around the circumference of the tire by measuring a maximum amplitude of the signal produced by the ultrasonic receiver.

8. The method of claim 7 wherein the amplitude of the signal produced by the ultrasonic receiver is measured during a time interval that continues after the ultrasonic transmitter ceases applying ultrasound to the tire wall.

9. The method of claim 7 wherein the amplitude of the signal produced by the ultrasonic receiver is measured several times per cycle of the ultrasound applied to the tire wall by the ultrasonic transmitter.

10. The method of claim 9 wherein the amplitude of the signal produced by the ultrasonic receiver is measured at least 10 times per cycle.

11. The method of claim 1 wherein the repetitive pattern present in the accumulated data is determined by finding a length for such pattern.

12. The method of claim 11 wherein the length of the repetitive pattern present in the accumulated data is found by:
  determining the magnitude of the difference between pairs of characterizing data for a plurality of pairs of locations which are all separated by a first specified distance;
  counting the number of such differences whose magnitude exceeds a threshold value;
  counting the total number of such differences;
  determining a ratio of the number of differences whose magnitude exceeds the threshold value to the total number of differences;
  determining if the ratio thus determined is less than other ratios obtained for other specified distances different from the first specified distance; and
  assigning as the pattern length the specified distance that has the lowest ratio of the number of differences whose magnitude exceeds the threshold value to the total number of differences.

13. The method of claim 1 wherein the repetitive pattern is used in searching for defective areas by selecting for comparison pairs of the accumulated data that have the same location with respect to the repetitive pattern.

14. The method of claim 1 further comprising the step of presenting a graphic display that depicts locations on the tire at which defects have been identified.

15. In a non-destructive method for testing tires employing pulses of ultrasound transmitted from a plurality of ultrasonic transmitters located on one side of a all of a tire to a plurality of ultrasonic receivers located on the opposite side of the tire's wall, the plurality of ultrasonic receivers being arranged into an array shaped to conform to a cross-section of the inner surface of the tire, the wall of the tire having an outer surface upon which the tire may roll and an inner surface which when sealed may be pressurized, an improvement comprising the steps of:
  inserting the array of ultrasonic receivers into the tire toward the inner surface thereof;
  after the array of ultrasonic receivers is within the tire rotating the array bout an axis to dispose the ultrasonic receivers across the tire between sidewalls thereof; and
  disposing the ultrasonic receivers at a pre-established distance from the inner surface of the tire.

16. The method of claim 15 further comprising the steps of:
  sealing the inner surface of the tire; and
  pressurizing the sealed inner surface of the tire.

17. The method of claim 16 further comprising the steps of:
  processing signals from an ultrasonic receiver for a plurality of locations distributed over the wall of the tire to detect ultrasound generated by leakage through the tire's wall from the pressurized inner surface thereof; and
  moving the tire to position in which it is disposed for conveniently inspecting a location where ultrasound is generated by leakage through the wall of the tire.

18. A nondestructive tire testing apparatus, comprising:
  encoder means for producing an electronic signal indicative of rotation of a tire;
  a plurality of electronic transmitters for producing ultrasound upon excitation by an electronic signal;
  transmitter exciting means responsive to the electronic signal from said encoder means for periodically exciting said ultrasonic transmitters to produce pulses of ultrasound at various locations around a circumference of a tire; said transmitter exciting means including transmitter selection means for selecting said ultrasonic transmitters for excitation one after another thereby causing said ultrasonic transmitters to produce a series of ultrasound pulses, said series of ultrasound pulses being produced periodically in response to the electronic signal from said encoder means at various locations around a circumference of a tire;
  a plurality of ultrasonic receivers equal to said plurality of ultrasonic trasmitters for receiving ultrasound and producing an electronic signal in response thereto, said transmitters and receivers being grouped into pairs, and said ultrasonic receivers being spaced from said ultrasonic transmitters to permit a single wall of a tire to pass there between;
  signal processing means for receiving the electrical signal from said ultrasonic receivers, for measuring values of the received electronic signal which characterize the transmission of ultrasound through a wall of a tire, and for storing said measured values;

data processing means for retrieving the measured values stored by said signal processing means, for determining characteristics of the transmission of ultrasound through a wall of a tire from said measured values at a plurality of locations distributed circumferentially about a tire, and for identifying defective locations on a tire from the characteristics of the ultrasound transmitted through a wall of a tire; and receiver signal multiplexing means, coupling the electronic signal from said ultrasonic receivers to said signal processing means and operating in synchronism with said transmitter selection means, for selectively coupling to said signal processing means the electronic signal from that ultrasonic receiver which is paired with the ultrasonic transmitter selected for excitation by said transmitter selection means.

19. A nondestructive tire testing apparatus, comprising:

encoder means for producing an electronic signal indicative of rotation of a tire;

a plurality of electronic transmitters for producing ultrasound upon excitation by an electronic signal;

transmitter exciting means responsive to the electronic signal from said encoder means for periodically exciting said ultrasonic transmitters to produce pulses of ultrasound at various locations around a circumference of a tire; said transmitter exciting means including transmitter selection means for selecting said ultrasonic transmitters for excitation one after another thereby causing said ultrasonic transmitters to produce a series of ultrasound pulses, said series of ultrasound pulses being produced periodically in response to the electronic signal from said encoder means at various locations around a circumference of a tire;

a plurality of ultrasonic receivers for receiving ultrasound and producing an electronic signal in response thereto, said ultrasonic receivers being arranged into an array shaped to conform to a cross-section of an inner surface of a tire and spaced from said ultrasonic transmitters to permit a single wall of a tire to pass there between;

receiver positioning means for retracting said array of ultrasonic receivers out of a tire during tire removal or installation and for inserting said array of ultrasonic receivers into a tire toward the inner surface thereof during tire testing, said receiver positioning means rotating said array of ultrasonic receivers about an axis after said array is within a tire to dispose said ultrasonic receivers across such tire between sidewalls thereof;

signal processing means for receiving the electrical signal from said ultrasonic receivers, for measuring values of the received electronic signal which characterize the transmission of ultrasound through a wall of a tire, and for storing said measured values; and data processing means for retrieving the measured values stored by said signal processing means, for determining characteristics of the transmission of ultrasound through a wall of a tire from said measured values at a plurality of locations distributed circumferentially about a tire, and for identifying defective locations on a tire from the characteristics of the ultrasound transmitted through a wall of a tire.

20. A nondestructive tire testing apparatus, comprising:

encoder means for producing an electronic signal indicative of rotation of a tire;

an ultrasonic transmitter for producing ultrasound upon excitation by an electronic signal;

transmitter exciting means responsive to the electronic signal from said encoder means for periodically exciting said ultrasonic transmitter to produce pulses of ultrasound at various locations around a circumference of a tire;

an ultrasonic receiver for receiving ultrasound and producing an electronic signal in response thereto, said ultrasonic receiver being spaced from said ultrasonic transmitter to permit a single wall of a tire to pass there between;

signal processing means for receiving the electrical signal from said ultrasonic receiver, for measuring values of the received electronic signal which characterize the transmission of ultrasound through a wall of a tire, and for storing said measured values;

data processing means for retrieving the measured values stored by said signal processing means, for determining characteristics of the transmission of ultrasound through a wall of a tire from said measured values at a plurality of locations distributed circumferentially about a tire, and for identifying defective locations on a tire from the characteristics of the ultrasound transmitted through a wall of a tire;

tire sensing means for contacting an outer surface of a tire to measure a diameter thereof; and pulse location control means operative in conjunction with said transmitter exciting means to establish the locations around a circumference of a tire at which said ultrasonic transmitter will be excited.

21. A nondestructive tire testing apparatus comprising:

encoder means for producing an electronic signal indicative of rotation of a tire;

an ultrasonic transmitter for producing ultrasound upon excitation by an electronic signal;

transmitter exciting means responsive to the electronic signal from said encoder means for periodically exciting said ultrasonic transmitter to produce pulses of ultrasound at various locations around a circumference of a tire;

an ultrasonic receiver for receiving ultrasound and producing an electronic signal in response thereto, said ultrasonic receiver being spaced from said ultrasonic transmitter to permit a single wall of a tire to pass there between;

signal processing means for receiving the electrical signal from said ultrasonic receiver, for measuring values of the received electronic signal which characterize the transmission of ultrasound through a wall of a tire, and for storing said measured values;

data processing means for retrieving the measured values stored by said signal processing means, for determining characteristics of the transmission of ultrasound through a wall of a tire from said measured values at a plurality of locations distributed circumferentially about a tire, and for identifying defective locations on a tire from the characteristics of the ultrasound transmitted through a wall of a tire; and tire mounting means adapted to seal a tire so it may be pressurized, said tire mounting means including a hub on each side of a tire together with rings which may be of various different outer diameters to adapt said tire mounting means for use with various different sizes of tires, one such ring being respectively juxtaposed about each of said hubs and sealed therewith to prevent leakage between said hub and said ring when a tire is pressurized.

22. A nondestructive tire testing apparatus, comprising:

encoder means for producing an electronic signal indicative of rotation of a tire;

an ultrasonic transmitter for producing ultrasound upon excitation by an electronic signal;

transmitter exciting means responsive to the electronic signal from said encoder means for periodically exciting said ultrasonic transmitter to produce pulses of ultrasound at various locations around a circumference of a tire;

an ultrasonic receiver for receiving ultrasound and producing an electronic signal in response thereto, said ultrasonic receiver being spaced from said ultrasonic transmitter to permit a single wall of a tire to pass there between;

signal processing means for receiving the electrical signal form said ultrasonic receiver, for measuring values of the received electronic signal which characterize the transmission of ultrasound through a wall of a tire during a time interval that continues after the ultrasonic transmitter ceases applying ultrasound to the wall of a tire, and for storing said measured values; and data processing means for retrieving the measured values stored by said signal processing means, for determining characteristics of the transmission of ultrasound through a wall of a tire from said measured values at a plurality of locations distributed circumferentially about a tire, and for identifying defective locations on a tire form the characteristics of the ultrasound transmitted through a wall of a tire.

* * * * *